United States Patent
Zhao et al.

(10) Patent No.: US 10,798,716 B2
(45) Date of Patent: Oct. 6, 2020

(54) NETWORK DEVICE, TERMINAL DEVICE, AND RESOURCE ALLOCATION METHOD

(71) Applicant: HUAWEI TECHNOLOGIES CO., LTD., Shenzhen, Guangdong (CN)

(72) Inventors: Zhenshan Zhao, Shenzhen (CN); Wei Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/833,578

(22) Filed: Dec. 6, 2017

(65) Prior Publication Data

US 2018/0098331 A1    Apr. 5, 2018

Related U.S. Application Data

(63) Continuation of application No. PCT/CN2015/081404, filed on Jun. 12, 2015.

(51) Int. Cl.
*H04W 72/08* (2009.01)
*H04W 72/04* (2009.01)
(Continued)

(52) U.S. Cl.
CPC ......... *H04W 72/082* (2013.01); *H04L 5/0092* (2013.01); *H04W 4/70* (2018.02);
(Continued)

(58) Field of Classification Search
None
See application file for complete search history.

(56) References Cited

U.S. PATENT DOCUMENTS

2014/0328329 A1    11/2014  Novlan et al.
2015/0215903 A1*   7/2015   Zhao ............... H04W 72/04
                                                        370/329

(Continued)

FOREIGN PATENT DOCUMENTS

CN    103546194 A    1/2014
CN    103686691 A    3/2014
(Continued)

OTHER PUBLICATIONS

3GPP TS 36.212 V124.0 (Mar. 2015),3rd Generation Partnership Project;Technical Specification Group Radio Access Network;Evolved Universal Terrestrial Radio Access (E-UTRA);Multiplexing and channel coding(Release 12),total 94 pages.

(Continued)

*Primary Examiner* — Anh Vu H Ly
(74) *Attorney, Agent, or Firm* — Fish & Richardson P.C.

(57) ABSTRACT

The present application discloses a resource allocation method, relates to the communications field, and resolves a problem that overall system performance is degraded because all vehicles use fixed four-time transmission when broadcasting service data packets to nearby vehicles. A specific solution is as follows: A receiving unit receives a transmission resource request sent by a first terminal device; a determining unit determines a quantity of transmission times in response to the transmission resource request received by the receiving unit; an allocation unit allocates a resource set to the first terminal device according to the quantity of transmission times determined by the determining unit, where a quantity of resources included in the resource set is equal to the quantity of transmission times; and a sending unit sends, to the first terminal device, time-frequency resource location information of each resource in the resource set allocated by the allocation unit.

8 Claims, 15 Drawing Sheets

(51) Int. Cl.
  *H04W 4/70*     (2018.01)
  *H04L 5/00*     (2006.01)
  *H04W 72/00*    (2009.01)
  *H04W 72/12*    (2009.01)
  *H04L 29/08*    (2006.01)

(52) U.S. Cl.
  CPC ......... *H04W 72/005* (2013.01); *H04W 72/04* (2013.01); *H04W 72/0406* (2013.01); *H04W 72/048* (2013.01); *H04W 72/1231* (2013.01); *H04L 5/0012* (2013.01); *H04L 5/0037* (2013.01); *H04L 5/0044* (2013.01); *H04L 5/0064* (2013.01); *H04L 67/12* (2013.01); *H04W 72/12* (2013.01)

(56) References Cited

U.S. PATENT DOCUMENTS

| | | | |
|---|---|---|---|
| 2015/0222401 A1 | 8/2015 | Xu et al. | |
| 2015/0319746 A1* | 11/2015 | Lu | H04W 72/042 370/280 |
| 2016/0037512 A1* | 2/2016 | Lei | H04W 72/04 370/336 |
| 2016/0044668 A1* | 2/2016 | Yoon | H04L 5/14 370/280 |
| 2016/0044669 A1* | 2/2016 | Yoon | H04W 76/14 370/336 |
| 2016/0044729 A1* | 2/2016 | Tu | H04W 74/04 370/329 |
| 2016/0183276 A1* | 6/2016 | Marinier | H04W 72/02 370/329 |
| 2016/0295624 A1* | 10/2016 | Novlan | H04W 76/14 370/329 |
| 2017/0006650 A1* | 1/2017 | Jung | H04W 72/0446 370/328 |
| 2017/0012753 A1* | 1/2017 | Kim | H04L 5/0048 370/328 |
| 2017/0041971 A1* | 2/2017 | Kim | H04W 76/14 370/329 |
| 2017/0150330 A1* | 5/2017 | Kim | H04W 72/042 370/328 |
| 2017/0171690 A1* | 6/2017 | Kim | H04W 4/00 370/329 |
| 2017/0230937 A1* | 8/2017 | Nguyen | H04W 72/02 370/329 |
| 2017/0230939 A1* | 8/2017 | Rudolf | H04W 72/04 370/329 |
| 2017/0230959 A1* | 8/2017 | Wu | H04W 72/02 370/328 |
| 2017/0280471 A1* | 9/2017 | Lee | H04W 72/12 370/328 |
| 2017/0303215 A1* | 10/2017 | Kim | H04W 52/48 370/328 |
| 2018/0176892 A1* | 6/2018 | Kim | H04W 52/04 370/328 |
| 2018/0338319 A1* | 11/2018 | Kim | H04W 76/14 370/328 |

FOREIGN PATENT DOCUMENTS

| | | |
|---|---|---|
| CN | 104144519 A | 11/2014 |
| CN | 104202821 A | 12/2014 |
| CN | 104640057 A | 5/2015 |
| WO | 2013045864 A1 | 4/2013 |
| WO | 2013162162 A1 | 10/2013 |
| WO | 2014178671 A1 | 11/2014 |
| WO | 2015028357 A1 | 3/2015 |

OTHER PUBLICATIONS

3GPP TS 36.213 V12.5.0 (Mar. 2015),3rd Generation Partnership Project;Technical Specification Group Radio Access Network;Evolved Universal Terrestrial Radio Access (E-UTRA);Physical layer procedures(Release 12),total 239 pages.

International Search Report in International Application No. PCT/CN2015/081404, dated Mar. 14, 2016, 6 pages.

Extended European Search Report issued in European Application No. 15894665.7 dated Apr. 16, 2018, 9 pages.

Office Action issued in Chinese Application No. 201580071202.8 dated Jun. 4, 2019, 20 pages (with English translation).

R1-135094,—CATT, "Resource allocation for D2D communication," 3GPP TSG RAN WG1 Meeting #75, Guangzhou, China, Oct. 7-11, 2013, 4 pages.

* cited by examiner

CONT.
FROM
FIG. 19A

| The first terminal device receives the time-frequency resource location information of each resource in the resource set sent by the network device | ← 1405 |

↓

| The network device sends the quantity of transmission times to the first terminal device | ← 1406 |

↓

| The first terminal device receives the quantity of transmission times sent by the network device | ← 1407 |

↓

| The first terminal device sends SA information to a second terminal device | ← 1408 |

↓

| The first terminal device sends, according to the time-frequency resource location information of each resource in the resource set, a to-be-transmitted service data packet to the second terminal device by using each resource in the resource set | ← 1409 |

↓

| The second terminal device receives the SA information sent by the first terminal device | ← 1410 |

↓

| The second terminal device obtains the quantity of transmission times | ← 1411 |

↓

| The second terminal device receives, according to the quantity of transmission times, the to-be-transmitted service data packet sent by the first terminal device by using each resource in the resource set | ← 1412 |

FIG. 19B

CONT.
FROM
FIG. 20A

The second terminal device receives configuration information of the first resource pool sent by the network device — 1509

The second terminal device determines, according to the configuration information of the currently monitored first resource pool, that a quantity of transmission times configured for the first resource pool is the quantity of transmission times — 1510

The second terminal device receives, according to the quantity of transmission times, the to-be-transmitted service data packet sent by the first terminal device by using each resource in the resource set — 1511

FIG. 20B

NETWORK DEVICE, TERMINAL DEVICE, AND RESOURCE ALLOCATION METHOD

CROSS-REFERENCE TO RELATED APPLICATIONS

This application is a continuation of International Application No. PCT/CN2015/081404, filed on Jun. 12, 2015, the disclosure of which is hereby incorporated by reference in its entirety.

TECHNICAL FIELD

The present application relates to the communications field, and in particular, to a network device, a terminal device, and a resource allocation method.

BACKGROUND

With continuous development of mobile communications technologies, Long Term Evolution (LTE) has become a mainstream wireless communications technology currently. A device-to-device (D2D) technology is used as an important feature and is standardized. The D2D technology is an end-to-end direct communications technology. A greatest difference between the D2D technology and a conventional cellular communications technology is that terminal devices using the D2D technology can directly communicate with each other without forwarding by a base station. In addition, with continuous development of the society, vehicles are also increasingly popular, and the corresponding Internet of vehicles also attracts more attention of people. In an Internet of vehicles system, vehicle-to-vehicle communication can improve safety and reliability of road transportation, and improve efficiency of road transportation. However, when a quantity of vehicles in the Internet of vehicles system is large, a resource collision tends to occur. Consequently, system performance becomes poor, and problems such as delay uncontrollability and no quality of service assurance may also occur. Exactly because various problems exist in the current Internet of vehicles system, people are stimulated to perform research on use of a cellular network to assist in vehicle-to-vehicle communication. In addition, because vehicle-to-vehicle communication is also end-to-end communication, using the D2D technology to perform vehicle-to-vehicle communication has become an important research subject in this field.

In the prior art, the D2D technology includes two transmission mechanisms: D2D discovery and D2D communication respectively. When the D2D discovery transmission mechanism is used, only a service data packet with a fixed size of 232 bits can be transmitted. However, in the Internet of vehicles system, a size of a service data packet broadcast by a vehicle to nearby vehicles is generally dozens of bytes to thousands of bytes. Therefore, D2D communication is generally used for vehicle-to-vehicle communication. Specifically, for example, in a D2D communication mode 1 of D2D communication, when a vehicle 1 needs to broadcast a service data packet, the vehicle 1 may first request transmission resources from a base station. The transmission resources include a scheduling assignment (SA) resource and a data (English: data) resource. Then the vehicle 1 uses the SA resource to broadcast SA information to nearby vehicles. The SA information is used to indicate a time-frequency resource location (namely, a time-frequency resource location of the data resource requested from the base station, in a data resource pool) of the service data packet to be sent by the vehicle 1, a modulation and coding scheme (MCS), a frequency hopping indication, a timing advance, and the like. Finally, the vehicle 1 broadcasts the service data packet in the time-frequency resource location indicated in the SA information, to the nearby vehicles by using the MCS, frequency hopping indication, timing advance, and the like that are indicated in the SA information.

The prior art has at least the following problem: As specified in a current protocol standard, when a vehicle broadcasts a service data packet to nearby vehicles, fixed four-time transmission needs to be used. That is, when a vehicle needs to transmit a service data packet, a base station needs to allocate four data resources from a data resource pool to the vehicle, for transmitting the service data packet. In this case, when multiple vehicles simultaneously need to transmit service data packets, because each vehicle needs to use fixed four-time transmission and available transmission resources are limited, the base station has to allocate, to different vehicles, transmission resources in which time resources are the same and frequency resources are the same or in which time resources are the same and frequency resources are adjacent. In this case, when different vehicles use transmission resources in which time resources are the same and frequency resources are the same to transmit service data packets, a transmission resource collision between the vehicles is caused, and therefore, overall system performance is degraded. When different vehicles use transmission resources in which time resources are the same and frequency resources are adjacent to transmit service data packets, mutual interference between the vehicles is caused by an in-band leakage, and therefore, overall system performance is also degraded.

SUMMARY

The present application provides a network device, a terminal device, and a resource allocation method to resolve a problem that overall system performance is degraded because all vehicles use fixed four-time transmission when broadcasting service data packets to nearby vehicles.

To achieve the foregoing objective, the present application uses the following technical solutions:

According to a first aspect of the present application, a network device is provided and includes:

a receiving unit, configured to receive a transmission resource request sent by a first terminal device;

a determining unit, configured to determine a quantity of transmission times in response to the transmission resource request received by the receiving unit;

an allocation unit, configured to allocate a resource set to the first terminal device according to the quantity of transmission times determined by the determining unit, where a quantity of resources included in the resource set is equal to the quantity of transmission times, and the resources are a set of one or more physical resource blocks used by the first terminal device to send a to-be-transmitted service data packet; and a sending unit, configured to send, to the first terminal device, time-frequency resource location information of each resource in the resource set allocated by the allocation unit.

With reference to the first aspect, in a possible implementation, the determining unit is specifically configured to:

determine the quantity of transmission times according to a load status of a current cell.

With reference to the first aspect or the foregoing possible implementation, in another possible implementation, the determining unit is specifically configured to:

determine the quantity of transmission times according to a quantity of available resources in a next scheduling period, a quantity of resources required in the next scheduling period, and a preset threshold.

With reference to the first aspect or the foregoing possible implementation, in another possible implementation, the quantity of available resources in the next scheduling period, the quantity of resources required in the next scheduling period, and the preset threshold that are used when the determining unit determines the quantity of transmission times meet the following conditions:

a ratio of the quantity of resources required in the next scheduling period to the quantity of available resources in the next scheduling period is less than the preset threshold; and the quantity of transmission times is obtained according to the quantity of resources required in the next scheduling period and a quantity of terminal devices that need to be scheduled in the next scheduling period.

With reference to the first aspect or the foregoing possible implementation, in another possible implementation, the determining unit is specifically configured to:

determine the quantity of transmission times according to a load status of a current cell and first information of the first terminal device, where the first information of the first terminal device includes at least one of the following: a level of the first terminal device, a service type of the first terminal device, or a quality of service QoS requirement of the first terminal device.

With reference to the first aspect or the foregoing possible implementation, in another possible implementation, the sending unit is further configured to broadcast the quantity of transmission times in the current cell, or send the quantity of transmission times to the first terminal device.

With reference to the first aspect or the foregoing possible implementation, in another possible implementation, the sending unit is specifically configured to:

broadcast, in the current cell, the quantity of transmission times by using a system broadcast message, radio resource control RRC signaling, or a common control channel.

With reference to the first aspect or the foregoing possible implementation, in another possible implementation, the sending unit is specifically configured to:

send the quantity of transmission times to the first terminal device by using dedicated RRC signaling or a dedicated control channel.

According to a second aspect of the present application, a network device is provided and includes:

a configuration unit, configured to configure at least two resource pools, and configure a corresponding quantity of transmission times for each resource pool in the at least two resource pools, where quantities of transmission times configured for different resource pools are different;

a receiving unit, configured to receive a transmission resource request sent by a first terminal device;

a determining unit, configured to determine, according to a load status of a current cell and first information of the first terminal device and in response to the transmission resource request received by the receiving unit, a first resource pool from the at least two resource pools configured by the configuration unit;

an allocation unit, configured to allocate a resource set from the first resource pool determined by the determining unit to the first terminal device, where the first information of the first terminal device includes at least one of the following: a level of the first terminal device, a service type of the first terminal device, or a quality of service QoS requirement of the first terminal device, a quantity of resources included in the resource set is equal to a quantity of transmission times configured for the first resource pool, and the resources are a set of one or more physical resource blocks used by the first terminal device to send a to-be-transmitted service data packet; and a sending unit, configured to send, to the first terminal device, time-frequency resource location information of each resource in the resource set allocated by the allocation unit.

With reference to the second aspect, in a possible implementation, the sending unit is further configured to broadcast, in the current cell, configuration information of each resource pool in the at least two resource pools after the configuration unit configures the at least two resource pools and configures the corresponding quantity of transmission times for each resource pool in the at least two resource pools, where the configuration information of the resource pool includes a quantity of transmission times configured for the resource pool.

According to a third aspect of the present application, a first terminal device is provided and includes:

a sending unit, configured to send a transmission resource request to a network device; and a receiving unit, configured to receive time-frequency resource location information of each resource in a resource set sent by the network device, where a quantity of resources included in the resource set is equal to a quantity of transmission times, the resources are a set of one or more physical resource blocks used by the first terminal device to send a to-be-transmitted service data packet, and the quantity of transmission times is determined by the network device; where the sending unit is further configured to send, according to the time-frequency resource location information of each resource in the resource set received by the receiving unit, the to-be-transmitted service data packet to a second terminal device by using each resource in the resource set.

With reference to the third aspect, in a possible implementation, the receiving unit is further configured to receive the quantity of transmission times sent by the network device.

With reference to the third aspect or the foregoing possible implementation, in another possible implementation, the receiving unit is specifically configured to:

receive the quantity of transmission times broadcast by the network device by using a system broadcast message, radio resource control RRC signaling, or a common control channel; or receive the quantity of transmission times sent by the network device by using dedicated RRC signaling or a dedicated control channel.

With reference to the third aspect or the foregoing possible implementation, in another possible implementation, the sending unit is further configured to send scheduling assignment SA information to the second terminal device before sending, according to the time-frequency resource location information of each resource in the resource set, the to-be-transmitted service data packet to the second terminal device by using each resource in the resource set, where the SA information carries the quantity of transmission times.

With reference to the third aspect or the foregoing possible implementation, in another possible implementation, the sending unit indicates the quantity of transmission times by using indication information added in the SA information.

With reference to the third aspect or the foregoing possible implementation, in another possible implementation, the sending unit indicates the quantity of transmission times by using a demodulation reference signal DMRS of the SA information; and the first terminal device further includes:

a processing unit, configured to set, before the sending unit sends the scheduling assignment SA information to the second terminal device, one or a combination of a cell identity cell ID, a cyclic shift CS, or an orthogonal cover code OCC of the SA information corresponding to the quantity of transmission times, and generate the DMRS of the SA information.

With reference to the third aspect or the foregoing possible implementation, in another possible implementation, the sending unit indicates the quantity of transmission times by using a scrambling sequence of the SA information; and the first terminal device further includes:

a processing unit, configured to set, before the sending unit sends the scheduling assignment SA information to the second terminal device, a cell ID and/or a radio network temporary identifier RNTI of the SA information corresponding to the quantity of transmission times, generate the scrambling sequence of the SA information, and scramble the SA information according to the scrambling sequence.

With reference to the third aspect or the foregoing possible implementation, in another possible implementation, the sending unit indicates the quantity of transmission times by using a mask; and the first terminal device further includes:

a processing unit, configured to multiply, before the sending unit sends the scheduling assignment SA information to the second terminal device, a cyclic redundancy check CRC of the SA information by the mask corresponding to the quantity of transmission times.

According to a fourth aspect of the present application, a first terminal device is provided and includes:

a sending unit, configured to send a transmission resource request to a network device; and a receiving unit, configured to receive time-frequency resource location information of each resource in a resource set sent by the network device, where a quantity of resources included in the resource set is equal to a quantity of transmission times configured for a first resource pool, the resources are a set of one or more physical resource blocks used by the first terminal device to send a to-be-transmitted service data packet, the first resource pool is determined by the network device from at least two configured resource pools according to a load status of a current cell and first information of the first terminal device, quantities of transmission times corresponding to resource pools in the at least two resource pools are different, and the first information of the first terminal device includes at least one of the following: a level of the first terminal device, a service type of the first terminal device, or a quality of service QoS requirement of the first terminal device; where the sending unit is further configured to send, according to the time-frequency resource location information of each resource in the resource set received by the receiving unit, the to-be-transmitted service data packet to a second terminal device by using each resource in the resource set.

With reference to the fourth aspect, in a possible implementation, the receiving unit is further configured to receive configuration information of each resource pool in the at least two resource pools, sent by the network device, where the configuration information of the resource pool includes a quantity of transmission times configured for the resource pool.

According to a fifth aspect of the present application, a first terminal device is provided and includes:

a determining unit, configured to determine a first resource pool according to first information of the first terminal device, where the first resource pool is one of at least two preconfigured resource pools, different quantities of transmission times are configured for resource pools in the at least two resource pools, and the first information of the first terminal device includes at least one of the following: a level of the first terminal device, a service type of the first terminal device, or a quality of service QoS requirement of the first terminal device; and determine a resource set from the first resource pool according to a quantity of transmission times configured for the first resource pool, where a quantity of resources included in the resource set is equal to the quantity of transmission times configured for the first resource pool, and the resources are a set of one or more physical resource blocks used by the first terminal device to send a to-be-transmitted service data packet; and a sending unit, configured to send the to-be-transmitted service data packet to a second terminal device by using each resource in the resource set determined by the determining unit.

According to a sixth aspect of the present application, a second terminal device is provided and includes:

an obtaining unit, configured to obtain a quantity of transmission times; and a receiving unit, configured to receive, according to the quantity of transmission times obtained by the obtaining unit, a to-be-transmitted service data packet sent by a first terminal device by using each resource in a resource set, where a quantity of resources included in the resource set is equal to the quantity of transmission times, and the resources are a set of one or more physical resource blocks.

With reference to the sixth aspect, in a possible implementation, the obtaining unit is specifically configured to:

receive the quantity of transmission times broadcast by a network device by using a system broadcast message, radio resource control RRC signaling, or a common control channel.

With reference to the sixth aspect or the foregoing possible implementation, in another possible implementation, the receiving unit is further configured to receive, before the obtaining unit obtains the quantity of transmission times, scheduling assignment SA information sent by the first terminal device, where the SA information carries the quantity of transmission times.

With reference to the sixth aspect or the foregoing possible implementation, in another possible implementation, indication information added in the SA information received by the receiving unit is used to indicate the quantity of transmission times; and the obtaining unit is specifically configured to determine the quantity of transmission times according to the indication information.

With reference to the sixth aspect or the foregoing possible implementation, in another possible implementation, a demodulation reference signal DMRS of the SA information received by the receiving unit is used to indicate the quantity of transmission times; and the obtaining unit is specifically configured to obtain the DMRS of the SA information, and determine the quantity of transmission times based on one or a combination of a cell identity cell ID, a cyclic shift CS, or an orthogonal cover code OCC in the DMRS.

With reference to the sixth aspect or the foregoing possible implementation, in another possible implementation, a scrambling sequence of the SA information received by the receiving unit is used to indicate the quantity of transmission times; and the obtaining unit is specifically configured to descramble the SA information, obtain the scrambling sequence of the SA information, and determine the quantity of transmission times according to a cell ID and/or a radio network temporary identifier RNTI in the scrambling sequence.

With reference to the sixth aspect or the foregoing possible implementation, in another possible implementation, a mask received by the receiving unit is used to indicate the quantity of transmission times; and the obtaining unit is specifically configured to obtain a cyclic redundancy check CRC of the SA information, and determine the quantity of transmission times according to the mask corresponding to the CRC.

With reference to the sixth aspect or the foregoing possible implementation, in another possible implementation, the obtaining unit is specifically configured to:

determine, according to configuration information of a currently monitored first resource pool, that a quantity of transmission times configured for the first resource pool is the quantity of transmission times, where the configuration information of the first resource pool includes the quantity of transmission times configured for the first resource pool.

With reference to the sixth aspect or the foregoing possible implementation, in another possible implementation, the first resource pool currently monitored by the obtaining unit is one of at least two preconfigured resource pools.

With reference to the sixth aspect or the foregoing possible implementation, in another possible implementation, the first resource pool currently monitored by the obtaining unit is one of at least two resource pools configured by a network device; and the receiving unit is further configured to receive, before the obtaining unit determines, according to the configuration information of the currently monitored first resource pool, the quantity of transmission times configured for the first resource pool, the configuration information of the first resource pool sent by the network device.

According to a seventh aspect of the present application, a resource allocation method is provided and includes:

receiving, by a network device, a transmission resource request sent by a first terminal device;

determining, by the network device, a quantity of transmission times in response to the transmission resource request, and allocating a resource set to the first terminal device according to the quantity of transmission times, where a quantity of resources included in the resource set is equal to the quantity of transmission times, and the resources are a set of one or more physical resource blocks used by the first terminal device to send a to-be-transmitted service data packet; and sending, by the network device, time-frequency resource location information of each resource in the resource set to the first terminal device.

With reference to the seventh aspect, in a possible implementation, the determining, by the network device, a quantity of transmission times includes:

determining, by the network device, the quantity of transmission times according to a load status of a current cell.

With reference to the seventh aspect or the foregoing possible implementation, in another possible implementation, the determining, by the network device, the quantity of transmission times according to a load status of a current cell includes:

determining, by the network device, the quantity of transmission times according to a quantity of available resources in a next scheduling period, a quantity of resources required in the next scheduling period, and a preset threshold.

With reference to the seventh aspect or the foregoing possible implementation, in another possible implementation, the quantity of available resources in the next scheduling period, the quantity of resources required in the next scheduling period, and the preset threshold meet the following conditions:

a ratio of the quantity of resources required in the next scheduling period to the quantity of available resources in the next scheduling period is less than the preset threshold; and the quantity of transmission times is obtained according to the quantity of resources required in the next scheduling period and a quantity of terminal devices that need to be scheduled in the next scheduling period.

With reference to the seventh aspect or the foregoing possible implementation, in another possible implementation, the determining, by the network device, a quantity of transmission times includes:

determining, by the network device, the quantity of transmission times according to a load status of a current cell and first information of the first terminal device, where the first information of the first terminal device includes at least one of the following: a level of the first terminal device, a service type of the first terminal device, or a quality of service QoS requirement of the first terminal device.

With reference to the seventh aspect or the foregoing possible implementation, in another possible implementation, the method further includes:

broadcasting, by the network device, the quantity of transmission times in the current cell; or sending, by the network device, the quantity of transmission times to the first terminal device.

With reference to the seventh aspect or the foregoing possible implementation, in another possible implementation, the broadcasting, by the network device, the quantity of transmission times in the current cell includes:

broadcasting, by the network device, in the current cell, the quantity of transmission times by using a system broadcast message, radio resource control RRC signaling, or a common control channel.

With reference to the seventh aspect or the foregoing possible implementation, in another possible implementation, the sending, by the network device, the quantity of transmission times to the first terminal device includes:

sending, by the network device, the quantity of transmission times to the first terminal device by using dedicated RRC signaling or a dedicated control channel.

According to an eighth aspect of the present application, a resource allocation method is provided and includes:

configuring, by a network device, at least two resource pools, and configuring a corresponding quantity of transmission times for each resource pool in the at least two resource pools, where quantities of transmission times configured for different resource pools are different;

receiving, by the network device, a transmission resource request sent by a first terminal device;

determining, by the network device, a first resource pool from the at least two resource pools according to a load status of a current cell and first information of the first terminal device and in response to the transmission resource request, and allocating a resource set from the first resource pool to the first terminal device, where the first information of the first terminal device includes at least one of the following: a level of the first terminal device, a service type of the first terminal device, or a quality of service QoS requirement of the first terminal device, a quantity of resources included in the resource set is equal to a quantity of transmission times configured for the first resource pool, and the resources are a set of one or more physical resource blocks used by the first terminal device to send a to-be-transmitted service data packet; and sending, by the network device, time-frequency resource location information of each resource in the resource set to the first terminal device.

With reference to the eighth aspect, in a possible implementation, after the configuring, by a network device, at least two resource pools, and configuring a corresponding quantity of transmission times for each resource pool in the at least two resource pools, the method further includes:

broadcasting, by the network device, in the current cell, configuration information of each resource pool in the at least two resource pools, where the configuration information of the resource pool includes a quantity of transmission times configured for the resource pool.

According to a ninth aspect of the present application, a resource allocation method is provided and includes:

sending, by a first terminal device, a transmission resource request to a network device;

receiving, by the first terminal device, time-frequency resource location information of each resource in a resource set sent by the network device, where a quantity of resources included in the resource set is equal to a quantity of transmission times, the resources are a set of one or more physical resource blocks used by the first terminal device to send a to-be-transmitted service data packet, and the quantity of transmission times is determined by the network device; and sending, by the first terminal device according to the time-frequency resource location information of each resource in the resource set, the to-be-transmitted service data packet to a second terminal device by using each resource in the resource set.

With reference to the ninth aspect, in a possible implementation, the method further includes:

receiving, by the first terminal device, the quantity of transmission times sent by the network device.

With reference to the ninth aspect or the foregoing possible implementation, in another possible implementation, the receiving, by the first terminal device, the quantity of transmission times sent by the network device includes:

receiving, by the first terminal device, the quantity of transmission times broadcast by the network device by using a system broadcast message, radio resource control RRC signaling, or a common control channel; or receiving, by the first terminal device, the quantity of transmission times sent by the network device by using dedicated RRC signaling or a dedicated control channel.

With reference to the ninth aspect or the foregoing possible implementation, in another possible implementation, before the sending, by the first terminal device according to the time-frequency resource location information of each resource in the resource set, the to-be-transmitted service data packet to a second terminal device by using each resource in the resource set, the method further includes:

sending, by the first terminal device, scheduling assignment SA information to the second terminal device, where the SA information carries the quantity of transmission times.

With reference to the ninth aspect or the foregoing possible implementation, in another possible implementation, indication information added in the SA information is used to indicate the quantity of transmission times.

With reference to the ninth aspect or the foregoing possible implementation, in another possible implementation, a demodulation reference signal DMRS of the SA information is used to indicate the quantity of transmission times; and before the sending, by the first terminal device, scheduling assignment SA information to the second terminal device, the method further includes:

setting one or a combination of a cell identity cell ID, a cyclic shift CS, or an orthogonal cover code OCC of the SA information corresponding to the quantity of transmission times, and generating the DMRS of the SA information.

With reference to the ninth aspect or the foregoing possible implementation, in another possible implementation, a scrambling sequence of the SA information is used to indicate the quantity of transmission times; and before the sending, by the first terminal device, scheduling assignment SA information to the second terminal device, the method further includes:

setting a cell ID and/or a radio network temporary identifier RNTI of the SA information corresponding to the quantity of transmission times, generating the scrambling sequence of the SA information, and scrambling the SA information according to the scrambling sequence.

With reference to the ninth aspect or the foregoing possible implementation, in another possible implementation, a mask is used to indicate the quantity of transmission times; and before the sending, by the first terminal device, scheduling assignment SA information to the second terminal device, the method further includes:

multiplying a cyclic redundancy check CRC of the SA information by the mask corresponding to the quantity of transmission times.

According to a tenth aspect of the present application, a resource allocation method is provided and includes:

sending, by a first terminal device, a transmission resource request to a network device;

receiving, by the first terminal device, time-frequency resource location information of each resource in a resource set sent by the network device, where a quantity of resources included in the resource set is equal to a quantity of transmission times configured for a first resource pool, the resources are a set of one or more physical resource blocks used by the first terminal device to send a to-be-transmitted service data packet, the first resource pool is determined by the network device from at least two configured resource pools according to a load status of a current cell and first information of the first terminal device, quantities of transmission times corresponding to resource pools in the at least two resource pools are different, and the first information of the first terminal device includes at least one of the following: a level of the first terminal device, a service type of the first terminal device, or a quality of service QoS requirement of the first terminal device; and sending, by the first terminal device according to the time-frequency resource location information of each resource in the resource set, the to-be-transmitted service data packet to a second terminal device by using each resource in the resource set.

With reference to the tenth aspect, in a possible implementation, the method further includes:

receiving, by the first terminal device, configuration information of each resource pool in the at least two resource pools, sent by the network device, where the configuration information of the resource pool includes a quantity of transmission times configured for the resource pool.

According to an eleventh aspect of the present application, a resource allocation method is provided and includes:

determining, by a first terminal device, a first resource pool according to first information of the first terminal device, where the first resource pool is one of at least two preconfigured resource pools, different quantities of transmission times are configured for resource pools in the at least two resource pools, and the first information of the first terminal device includes at least one of the following: a level of the first terminal device, a service type of the first terminal device, or a quality of service QoS requirement of the first terminal device;

determining, by the first terminal device, a resource set from the first resource pool according to a quantity of transmission times configured for the first resource pool, where a quantity of resources included in the resource set is equal to the quantity of transmission times configured for the first resource pool, and the resources are a set of one or more physical resource blocks used by the first terminal device to send a to-be-transmitted service data packet; and sending, by the first terminal device, the to-be-transmitted service data packet to a second terminal device by using each resource in the resource set.

According to a twelfth aspect of the present application, a resource allocation method is provided and includes:

obtaining, by a second terminal device, a quantity of transmission times; and receiving, by the second terminal device according to the quantity of transmission times, a to-be-transmitted service data packet sent by a first terminal device by using each resource in a resource set, where a quantity of resources included in the resource set is equal to the quantity of transmission times, and the resources are a set of one or more physical resource blocks.

With reference to the twelfth aspect, in a possible implementation, the obtaining, by a second terminal device, a quantity of transmission times includes:

receiving, by the second terminal device, the quantity of transmission times broadcast by a network device by using a system broadcast message, radio resource control RRC signaling, or a common control channel.

With reference to the twelfth aspect or the foregoing possible implementation, in another possible implementation, before the obtaining, by a second terminal device, a quantity of transmission times, the method further includes:

receiving, by the second terminal device, scheduling assignment SA information sent by the first terminal device, where the SA information carries the quantity of transmission times.

With reference to the twelfth aspect or the foregoing possible implementation, in another possible implementation, indication information added in the SA information is used to indicate the quantity of transmission times; and the obtaining, by a second terminal device, a quantity of transmission times includes:

determining, by the second terminal device, the quantity of transmission times according to the indication information.

With reference to the twelfth aspect or the foregoing possible implementation, in another possible implementation, a demodulation reference signal DMRS of the SA information is used to indicate the quantity of transmission times; and the obtaining, by a second terminal device, a quantity of transmission times includes:

obtaining, by the second terminal device, the DMRS of the SA information, and determining the quantity of transmission times based on one or a combination of a cell identity cell ID, a cyclic shift CS, or an orthogonal cover code OCC in the DMRS.

With reference to the twelfth aspect or the foregoing possible implementation, in another possible implementation, a scrambling sequence of the SA information is used to indicate the quantity of transmission times; and the obtaining, by a second terminal device, a quantity of transmission times includes:

descrambling, by the second terminal device, the SA information, obtaining the scrambling sequence of the SA information, and determining the quantity of transmission times according to a cell ID and/or a radio network temporary identifier RNTI in the scrambling sequence.

With reference to the twelfth aspect or the foregoing possible implementation, in another possible implementation, a mask is used to indicate the quantity of transmission times; and the obtaining, by a second terminal device, a quantity of transmission times includes:

obtaining, by the second terminal device, a cyclic redundancy check CRC of the SA information, and determining the quantity of transmission times according to the mask corresponding to the CRC.

With reference to the twelfth aspect or the foregoing possible implementation, in another possible implementation, the obtaining, by a second terminal device, a quantity of transmission times includes:

determining, by the second terminal device according to configuration information of a currently monitored first resource pool, that a quantity of transmission times configured for the first resource pool is the quantity of transmission times, where the configuration information of the first resource pool includes the quantity of transmission times configured for the first resource pool.

With reference to the twelfth aspect or the foregoing possible implementation, in another possible implementation, the first resource pool is one of at least two preconfigured resource pools.

With reference to the twelfth aspect or the foregoing possible implementation, in another possible implementation, the first resource pool is one of at least two resource pools configured by a network device; and before the determining, by the second terminal device according to configuration information of a currently monitored first resource pool, a quantity of transmission times configured for the first resource pool, the method further includes:

receiving, by the second terminal device, the configuration information of the first resource pool sent by the network device.

According to a thirteenth aspect of the present application, a network device is provided and includes:

a receiver, configured to receive a transmission resource request sent by a first terminal device; where a processor, configured to determine a quantity of transmission times in response to the transmission resource request received by the receiver, and allocate a resource set to the first terminal device according to the quantity of transmission times, where a quantity of resources included in the resource set is equal to the quantity of transmission times, and the resources are a set of one or more physical resource blocks used by the first terminal device to send a to-be-transmitted service data packet; and a transmitter, configured to send, to the first terminal device, time-frequency resource location information of each resource in the resource set allocated by the processor.

With reference to the thirteenth aspect, in a possible implementation, the processor is specifically configured to:

determine the quantity of transmission times according to a load status of a current cell.

With reference to the thirteenth aspect or the foregoing possible implementation, in another possible implementation, the processor is specifically configured to:

determine the quantity of transmission times according to a quantity of available resources in a next scheduling period, a quantity of resources required in the next scheduling period, and a preset threshold.

With reference to the thirteenth aspect or the foregoing possible implementation, in another possible implementation, the quantity of available resources in the next scheduling period, the quantity of resources required in the next scheduling period, and the preset threshold that are used when the processor determines the quantity of transmission times meet the following conditions:

a ratio of the quantity of resources required in the next scheduling period to the quantity of available resources in the next scheduling period is less than the preset threshold; and the quantity of transmission times is obtained according to the quantity of resources required in the next scheduling period and a quantity of terminal devices that need to be scheduled in the next scheduling period.

With reference to the thirteenth aspect or the foregoing possible implementation, in another possible implementation, the processor is specifically configured to:

determine the quantity of transmission times according to a load status of a current cell and first information of the first terminal device, where the first information of the first terminal device includes at least one of the following: a level of the first terminal device, a service type of the first terminal device, or a quality of service QoS requirement of the first terminal device.

With reference to the thirteenth aspect or the foregoing possible implementation, in another possible implementation, the transmitter is further configured to broadcast the quantity of transmission times in the current cell, or send the quantity of transmission times to the first terminal device.

With reference to the thirteenth aspect or the foregoing possible implementation, in another possible implementation, the transmitter is specifically configured to:

broadcast, in the current cell, the quantity of transmission times by using a system broadcast message, radio resource control RRC signaling, or a common control channel.

With reference to the thirteenth aspect or the foregoing possible implementation, in another possible implementation, the transmitter is specifically configured to:

send the quantity of transmission times to the first terminal device by using dedicated RRC signaling or a dedicated control channel.

According to a fourteenth aspect of the present application, a network device is provided and includes:

a processor, configured to configure at least two resource pools, and configure a corresponding quantity of transmission times for each resource pool in the at least two resource pools, where quantities of transmission times configured for different resource pools are different;

a receiver, configured to receive a transmission resource request sent by a first terminal device; where the processor is further configured to determine a first resource pool from the at least two resource pools according to a load status of a current cell and first information of the first terminal device and in response to the transmission resource request received by the receiver, and allocate a resource set from the first resource pool to the first terminal device, where the first information of the first terminal device includes at least one of the following: a level of the first terminal device, a service type of the first terminal device, or a quality of service QoS requirement of the first terminal device, a quantity of resources included in the resource set is equal to a quantity of transmission times configured for the first resource pool, and the resources are a set of one or more physical resource blocks used by the first terminal device to send a to-be-transmitted service data packet; and a transmitter, configured to send, to the first terminal device, time-frequency resource location information of each resource in the resource set allocated by the processor.

With reference to the fourteenth aspect, in a possible implementation, the transmitter is further configured to broadcast, in the current cell, configuration information of each resource pool in the at least two resource pools after the processor configures the at least two resource pools and configures the corresponding quantity of transmission times for each resource pool in the at least two resource pools, where the configuration information of the resource pool includes a quantity of transmission times configured for the resource pool.

According to a fifteenth aspect of the present application, a first terminal device is provided and includes:

a transmitter, configured to send a transmission resource request to a network device; and a receiver, configured to receive time-frequency resource location information of each resource in a resource set sent by the network device, where a quantity of resources included in the resource set is equal to a quantity of transmission times, the resources are a set of one or more physical resource blocks used by the first terminal device to send a to-be-transmitted service data packet, and the quantity of transmission times is determined by the network device; where the transmitter is further configured to send, according to the time-frequency resource location information of each resource in the resource set received by the receiver, the to-be-transmitted service data packet to a second terminal device by using each resource in the resource set.

With reference to the fifteenth aspect, in a possible implementation, the receiver is further configured to receive the quantity of transmission times sent by the network device.

With reference to the fifteenth aspect or the foregoing possible implementation, in another possible implementation, the receiver is specifically configured to:

receive the quantity of transmission times broadcast by the network device by using a system broadcast message, radio resource control RRC signaling, or a common control channel; or receive the quantity of transmission times sent by the network device by using dedicated RRC signaling or a dedicated control channel.

With reference to the fifteenth aspect or the foregoing possible implementation, in another possible implementation, the transmitter is further configured to send scheduling assignment SA information to the second terminal device before sending, according to the time-frequency resource location information of each resource in the resource set, the to-be-transmitted service data packet to the second terminal device by using each resource in the resource set, where the SA information carries the quantity of transmission times.

With reference to the fifteenth aspect or the foregoing possible implementation, in another possible implementation, the transmitter indicates the quantity of transmission times by using indication information added in the SA information.

With reference to the fifteenth aspect or the foregoing possible implementation, in another possible implementation, the transmitter indicates the quantity of transmission times by using a demodulation reference signal DMRS of the SA information; and the first terminal device further includes:

a processor, configured to set, before the transmitter sends the scheduling assignment SA information to the second terminal device, one or a combination of a cell identity cell ID, a cyclic shift CS, or an orthogonal cover code OCC of the SA information corresponding to the quantity of transmission times, and generate the DMRS of the SA information.

With reference to the fifteenth aspect or the foregoing possible implementation, in another possible implementation, the transmitter indicates the quantity of transmission times by using a scrambling sequence of the SA information; and the first terminal device further includes:

a processor, configured to set, before the transmitter sends the scheduling assignment SA information to the second terminal device, a cell ID and/or a radio network temporary identifier RNTI of the SA information corresponding to the quantity of transmission times, generate the scrambling sequence of the SA information, and scramble the SA information according to the scrambling sequence.

With reference to the fifteenth aspect or the foregoing possible implementation, in another possible implementation, the transmitter indicates the quantity of transmission times by using a mask; and the first terminal device further includes:

a processor, configured to multiply, before the transmitter sends the scheduling assignment SA information to the second terminal device, a cyclic redundancy check CRC of the SA information by the mask corresponding to the quantity of transmission times.

According to a sixteenth aspect of the present application, a first terminal device is provided and includes:

a transmitter, configured to send a transmission resource request to a network device; and a receiver, configured to receive time-frequency resource location information of each resource in a resource set sent by the network device, where a quantity of resources included in the resource set is equal to a quantity of transmission times configured for a first resource pool, the resources are a set of one or more physical resource blocks used by the first terminal device to send a to-be-transmitted service data packet, the first resource pool is determined by the network device from at least two configured resource pools according to a load status of a current cell and first information of the first terminal device, quantities of transmission times corresponding to resource pools in the at least two resource pools are different, and the first information of the first terminal device includes at least one of the following: a level of the first terminal device, a service type of the first terminal device, or a quality of service QoS requirement of the first terminal device; where the transmitter is further configured to send, according to the time-frequency resource location information of each resource in the resource set received by the receiver, the to-be-transmitted service data packet to a second terminal device by using each resource in the resource set.

With reference to the sixteenth aspect, in a possible implementation, the receiver is further configured to receive configuration information of each resource pool in the at least two resource pools, sent by the network device, where the configuration information of the resource pool includes a quantity of transmission times configured for the resource pool.

According to a seventeenth aspect of the present application, a first terminal device is provided and includes:

a processor, configured to determine a first resource pool according to first information of the first terminal device, where the first resource pool is one of at least two preconfigured resource pools, different quantities of transmission times are configured for resource pools in the at least two resource pools, and the first information of the first terminal device includes at least one of the following: a level of the first terminal device, a service type of the first terminal device, or a quality of service QoS requirement of the first terminal device; and determine a resource set from the first resource pool according to a quantity of transmission times configured for the first resource pool, where a quantity of resources included in the resource set is equal to the quantity of transmission times configured for the first resource pool, and the resources are a set of one or more physical resource blocks used by the first terminal device to send a to-be-transmitted service data packet; and a transmitter, configured to send the to-be-transmitted service data packet to a second terminal device by using each resource in the resource set determined by the processor.

According to an eighteenth aspect of the present application, a second terminal device is provided and includes:

a processor, configured to obtain a quantity of transmission times; and a receiver, configured to receive, according to the quantity of transmission times obtained by the processor, a to-be-transmitted service data packet sent by a first terminal device by using each resource in a resource set, where a quantity of resources included in the resource set is equal to the quantity of transmission times, and the resources are a set of one or more physical resource blocks.

With reference to the eighteenth aspect, in a possible implementation, the receiver is further configured to receive the quantity of transmission times broadcast by a network device by using a system broadcast message, radio resource control RRC signaling, or a common control channel.

With reference to the eighteenth aspect or the foregoing possible implementation, in another possible implementation, the receiver is further configured to receive, before the processor obtains the quantity of transmission times, scheduling assignment SA information sent by the first terminal device, where the SA information carries the quantity of transmission times.

With reference to the eighteenth aspect or the foregoing possible implementation, in another possible implementation, indication information added in the SA information received by the receiver is used to indicate the quantity of transmission times; and the processor is specifically configured to determine the quantity of transmission times according to the indication information.

With reference to the eighteenth aspect or the foregoing possible implementation, in another possible implementation, a demodulation reference signal DMRS of the SA information received by the receiver is used to indicate the quantity of transmission times; and the processor is specifically configured to obtain the DMRS of the SA information, and determine the quantity of transmission times based on one or a combination of a cell identity cell ID, a cyclic shift CS, or an orthogonal cover code OCC in the DMRS.

With reference to the eighteenth aspect or the foregoing possible implementation, in another possible implementation, a scrambling sequence of the SA information received by the receiver is used to indicate the quantity of transmission times; and the processor is specifically configured to descramble the SA information, obtain the scrambling sequence of the SA information, and determine the quantity of transmission times according to a cell ID and/or a radio network temporary identifier RNTI in the scrambling sequence.

With reference to the eighteenth aspect or the foregoing possible implementation, in another possible implementation, a mask received by the receiver is used to indicate the quantity of transmission times; and the processor is specifically configured to obtain a cyclic redundancy check CRC of the SA information, and determine the quantity of transmission times according to the mask corresponding to the CRC.

With reference to the eighteenth aspect or the foregoing possible implementation, in another possible implementation, the processor is specifically configured to:

determine, according to configuration information of a currently monitored first resource pool, that a quantity of transmission times configured for the first resource pool is the quantity of transmission times, where the configuration information of the first resource pool includes the quantity of transmission times configured for the first resource pool.

With reference to the eighteenth aspect or the foregoing possible implementation, in another possible implementation, the first resource pool currently monitored by the processor is one of at least two preconfigured resource pools.

With reference to the eighteenth aspect or the foregoing possible implementation, in another possible implementation, the first resource pool currently monitored by the processor is one of at least two resource pools configured by a network device; and the receiver is further configured to receive, before the processor determines, according to the configuration information of the currently monitored first resource pool, the quantity of transmission times configured for the first resource pool, the configuration information of the first resource pool sent by the network device.

According to the network device, terminal device, and resource allocation method provided by the present application, the network device first determines a quantity of transmission times in response to a received transmission resource request sent by a first terminal device, then allocates, to the first terminal device according to the determined quantity of transmission times, a resource set including a quantity of resources that is equal to the quantity of transmission times, and sends time-frequency resource location information of each resource in the resource set to the first terminal device, so that the first terminal device sends a to-be-transmitted service data packet according to the time-frequency resource location information of each resource in the resource set. In this way, the network device flexibly configures the quantity of transmission times, a probability that transmission resources in which time resources are the same and frequency resources are the same or in which time resources are the same and frequency resources are adjacent are allocated to different terminal devices is reduced, and therefore, overall system performance is improved.

BRIEF DESCRIPTION OF DRAWINGS

To describe the technical solutions in some embodiments of the present application or in the prior art more clearly, the following briefly describes the accompanying drawings. Apparently, the accompanying drawings in the following description show merely some embodiments of the present application, and a person of ordinary skill in the art may still derive other drawings from these accompanying drawings without creative efforts.

FIG. 19A and FIG. 19B are a flowchart of a resource allocation method according to another embodiment of the present application;

FIG. 20A and FIG. 20B are a flowchart of a resource allocation method according to another embodiment of the present application;

DESCRIPTION OF EMBODIMENTS

Figure 1:
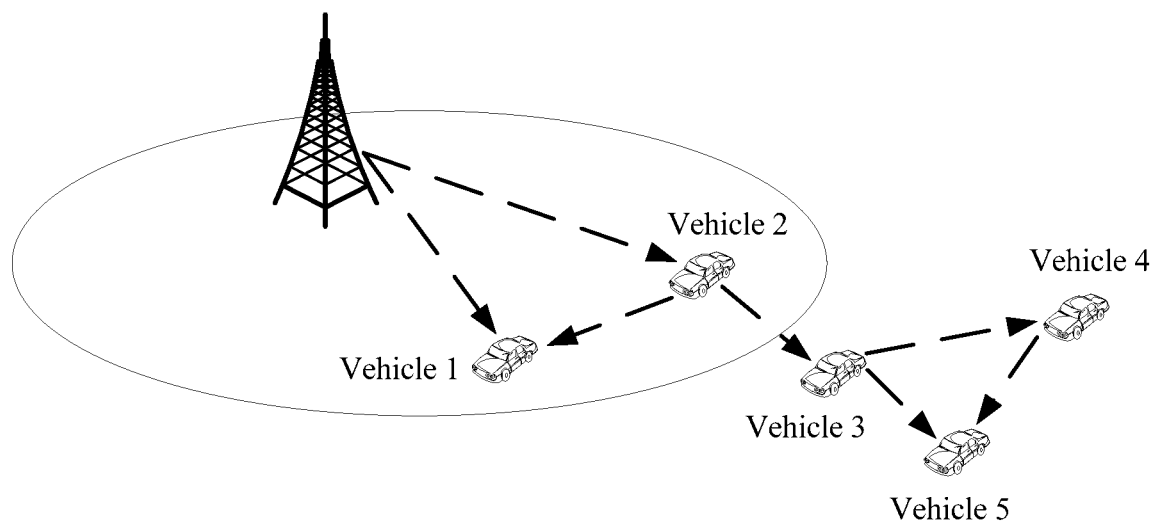
FIG. 1 is a schematic diagram of an application scenario of vehicle-to-vehicle communication according to the present application.

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

Technologies described in this specification may be applied to various communications systems, for example, current 2G and 3G communications systems and a next-generation communications system, for example, a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a general packet radio service (GPRS) system, a Long Term Evolution (LTE) system, and other communications systems.

Various aspects are described in this specification with reference to a terminal and/or a base station and/or a base station node.

The user equipment may be a wireless terminal or a wired terminal. The wireless terminal may be a device that provides a user with voice and/or data connectivity, a handheld device with a radio connection function, or another processing device connected to a radio modem. The wireless terminal may communicate with one or more core networks by using a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal (Mobile), a remote station, an access point, a remote terminal, an access terminal, a user terminal, a user agent, or user equipment.

The base station (for example, an access point) may be a device in communication with a wireless terminal via one or more sectors at an air interface in an access network. The base station may be configured to mutually convert a received over-the-air frame and an IP packet and serve as a router between the wireless terminal and a rest portion of the access network, where the rest portion of the access network may include an Internet protocol (IP) network. The base station may coordinate attribute management of the air interface. For example, the base station may be a base transceiver station (BTS) in GSM or CDMA, may be a NodeB (NodeB) in WCDMA, or may be an evolved NodeB (NodeB, eNB, or e-NodeB for short) in LTE, which is not limited in this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Currently, to improve safety and reliability of road transportation and improve efficiency of road transportation, people pay more attention to the Internet of vehicles. In an Internet of vehicles system, a vehicle may obtain road condition information in time by performing vehicle-to-vehicle communication or vehicle to roadside unit (RSU) communication, so that a driver can predetermine and avoid a dangerous condition in time according to the obtained road condition information. In this way, an objective of improving safety and reliability of road transportation and improving efficiency of road transportation is achieved. In the United States, the Internet of vehicles system is also referred to as a wireless access in vehicular environments (WAVE) system. A physical layer of the system mainly uses the Institute of Electrical and Electronics Engineers (IEEE) 802.11p protocol. The IEEE 802.11p protocol is a communications protocol extended from the IEEE 802.11 standard. The IEEE 802.11p protocol is mainly applied to in-vehicle electronic wireless communication, and is in essence an extension of the IEEE 802.11 standard, and complies with related applications of an intelligent transportation system (ITS). The WAVE system has advantages of easy deployment, low costs, mature technologies, being applicable to transmission of service data packets between vehicles, and the like. However, when a quantity of vehicles in the Internet of vehicles system is large, a resource collision tends to occur. Consequently, system performance becomes poor, and problems such as delay uncontrollability and no quality of service (QoS) assurance may also occur. In addition, in the Internet of vehicles system, there is a problem that deployment costs are increased because a vehicle-to-vehicle transmission distance is limited and a large quantity of RSUs need to be deployed.

Exactly because various problems exist in the current Internet of vehicles system, people are stimulated to perform research on use of a cellular network to assist in vehicleto-vehicle communication. In addition, because vehicle-to-vehicle communication is end-to-end communication, and considering advantages of an LTE technology such as a high rate, a low delay, large coverage, and support for high-speed mobile terminals, and because a D2D technology in LTE supports direct communication between terminal devices, the D2D technology may be used to perform vehicle-to-vehicle communication. In addition, in the D2D technology, because a central scheduler (for example, a base station) may perform work such as resource configuration, scheduling, and coordination to assist in direct communication between terminal devices, if the central scheduler is fully used to dynamically schedule transmission resources, a resource collision probability may be reduced, and the problem of delay uncontrollability is resolved.

When the cellular network is used to perform vehicle-to-vehicle communication, two scenarios are included: in cell coverage (IC) and out of cell coverage (OOC). As shown in FIG. 1, a vehicle 1 and a vehicle 2 are located in cell coverage; a vehicle 3, a vehicle 4, and a vehicle 5 are located out of cell coverage. That is, communication between the vehicle 1 and the vehicle 2 is vehicle-to-vehicle communication in the IC scenario, and communication between the vehicle 3, the vehicle 4, and the vehicle 5 is vehicle-to-vehicle communication in the OOC scenario. In the IC scenario, a base station may perform work such as transmission resource allocation and interference coordination, that is, in this scenario, resources used when a service data packet is transmitted between vehicles are scheduled by the base station.

As universally known, the D2D technology is discussed in the 3rd Generation Partnership Project (3GPP), and the D2D technology in Long Term Evolution Release 12 (LTE Rel.12) uses a broadcast form to transmit data. The D2D technology includes two transmission mechanisms: D2D discovery and D2D communication respectively.

In D2D discovery, a terminal device broadcasts information periodically, so that terminal devices around the terminal device can detect the information and discover the terminal device.

D2D communication is direct communication between two terminal devices, and a mechanism of SA+data is used. Specifically, when a terminal device needs to broadcast a service data packet, the terminal device first broadcasts SA information, where the SA information is mainly used to indicate information such as a time-frequency resource location of the service data packet to be sent by the terminal device, an MCS, a frequency hopping indication, a timing advance, and a receiving group identity (ID), so that a receive end receives the service data packet according to the SA information. The current protocol standard specifies that the SA information is transmitted twice, that is, the terminal device needs to broadcast the SA information twice. Then, the terminal device broadcasts, according to the receiving group ID by using the information indicated in the SA information such as the MCS, frequency hopping indication, and timing advance, the service data packet that needs to be transmitted. The current protocol standard specifies that the service data packet is transmitted for four times fixedly, that is, the transmit end needs to broadcast the service data packet for four times.

It can be known that, when D2D discovery is used, only a service data packet with a fixed size can be transmitted, and generally the fixed size is 232 bits, but when D2D communication is used, a service data packet with a variable size can be transmitted, a dynamically adjustable MCS is supported, and a low delay feature also exists. Considering that a size of a service data packet broadcast periodically by a vehicle to nearby vehicles is generally dozens of bytes to thousands of bytes in the Internet of vehicles system, far beyond a transmission capability of D2D discovery, and that transmission of the service data packet requires a very low delay to ensure validity of the service data packet, D2D communication is generally used for vehicle-to-vehicle communication.

When D2D communication is used for communication, transmission resources used when a terminal device broadcasts SA information and a service data packet may be allocated from a resource pool by the base station to the transmit end (this is a D2D communication mode 1 in D2D communication, and the mode is applicable to the application scenario in cell coverage), or may be selected by the terminal device itself from a resource pool (this is a D2D communication mode 2 in D2D communication, and the mode is applicable to various application scenarios such as in cell coverage or out of cell coverage). The resource pool is a set of transmission resources, and is time-frequency resource information configured by the base station for D2D transmission. The base station may configure different resource pools, for example, a discovery resource pool, an SA resource pool, and a data resource pool. Resources used when the terminal device broadcasts the service data packet may be selected from the data resource pool.

As can be seen from above, when a terminal device (such as a vehicle) needs to broadcast a service data packet to nearby devices, because the protocol standard specifies that fixed four-time transmission needs to be used, the base station needs to allocate four data resources from the data resource pool to the terminal device (or the transmit end randomly selects four data resources from the data resource pool) in this case, for transmitting the service data packet. In this case, when multiple terminal devices need to transmit service data packets simultaneously (for example, a vehicle 1, a vehicle 2, and a vehicle 3 are located in one cell, where the vehicle 1 and the vehicle 2 are transmitting vehicles, and the vehicle 3 is a receiving vehicle), because each terminal device (the vehicle 1 and the vehicle 2) needs to use fixed four-time transmission, and available transmission resources are limited, the following problems occur.

Figure 2:
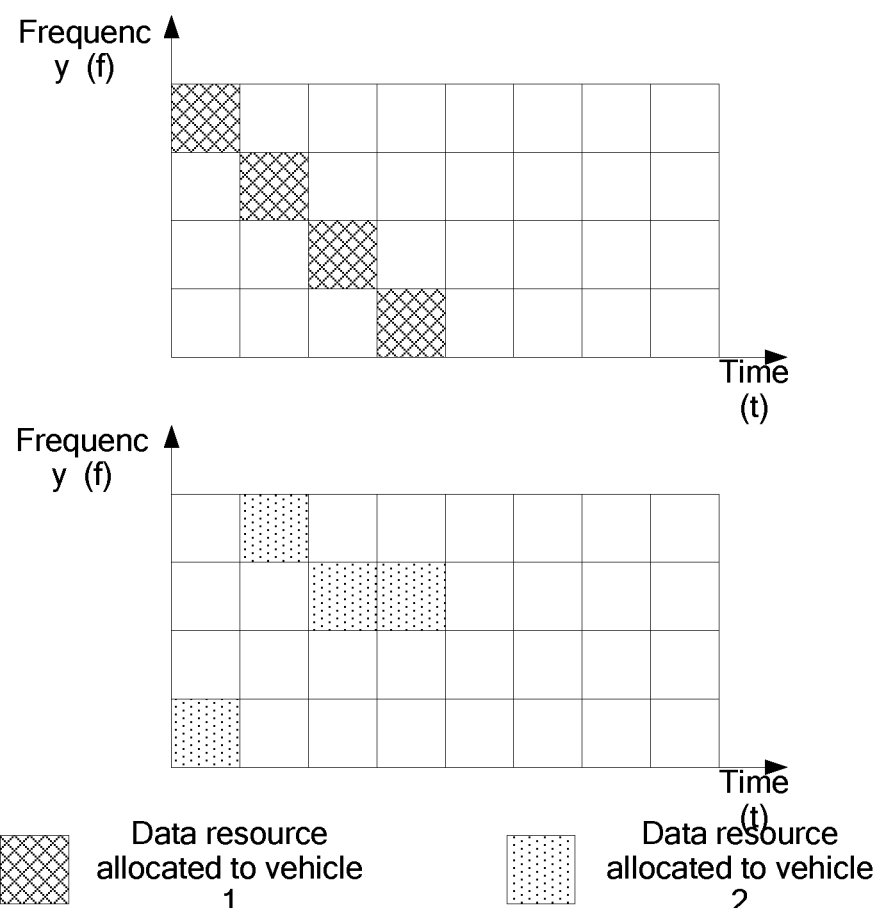
FIG. 2 is a schematic diagram of resource allocation according to the present application.

Problem 1: As shown in FIG. 2, assuming that time resources in four data (English: data) resources allocated from the data resource pool to the vehicle 1 and the vehicle 2 are the same, in this case, because both the vehicle 1 and the vehicle 2 use a half-duplex transmission mechanism, the vehicle 1 and the vehicle 2 cannot receive the service data packet sent by each other.

Figure 3:
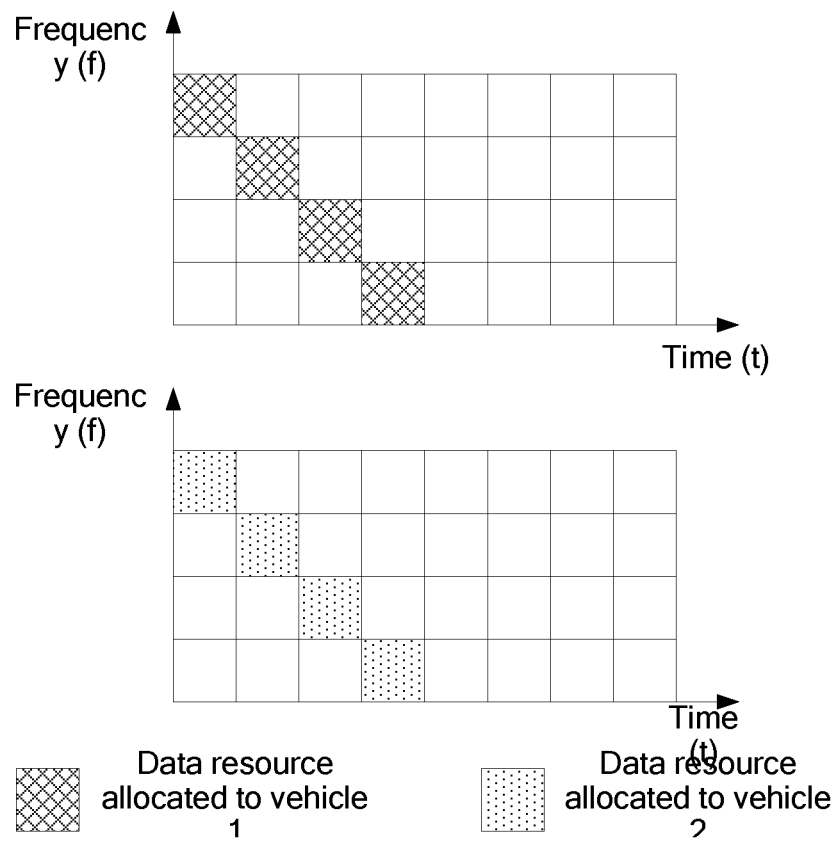
FIG. 3 is another schematic diagram of resource allocation according to the present application.

Problem 2: As shown in FIG. 3, assuming that time resources are the same and frequency resources are the same in four data resources allocated from the data resource pool to the vehicle 1 and the vehicle 2, in this case, due to a transmission resource collision, receiving performance of the receiving vehicle, namely, the vehicle 3, is reduced because the vehicle 3 receives interference from the vehicle 2 when receiving a service data packet sent by the vehicle 1; likewise, receiving performance of the vehicle 3 is reduced because the vehicle 3 receives interference from the vehicle 1 when receiving a service data packet sent by the vehicle 2. Therefore, overall system performance is degraded.

Figure 4:
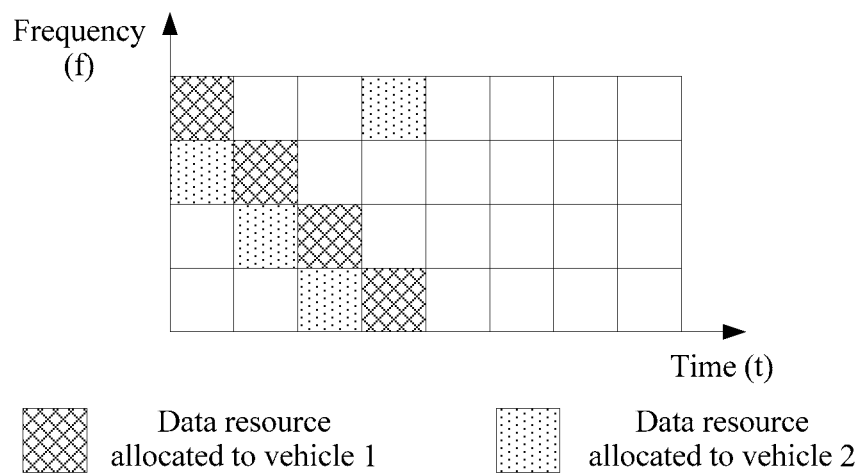
FIG. 4 is still another schematic diagram of resource allocation according to the present application.

Problem 3: As shown in FIG. 4, assuming that time resources are the same and frequency resources are adjacent in four data resources allocated from the data resource pool to the vehicle 1 and the vehicle 2, in this case, due to an in-band leakage, mutual interference is caused between the vehicle 1 and the vehicle 2. For example, a distance between the vehicle 2 and the vehicle 3 is short. In this case, a path loss from the vehicle 2 to the vehicle 3 is very small, and the vehicle 3 receives interference from the vehicle 2 when receiving a service data packet sent by the vehicle 1. Therefore, overall system performance is degraded.

The resource allocation method provided by the present application can resolve the foregoing problems well. In addition, for ease of understanding by a person skilled in the art, in the present application, specific implementation processes of the technical solutions provided by the present application are described by using the following embodiments.

It should be noted that, the network device in the present application may be a device that has a radio resource management function and can communicate with a terminal device or assist terminal devices in direct communication as a central controller, such as a base station. The terminal device in the present application may be a device that can communicate with the network device or can directly communicate with another terminal device, such as a handheld device or a vehicle. The network device and the terminal device are not specifically limited in the embodiments of the present application.

Figure 5:
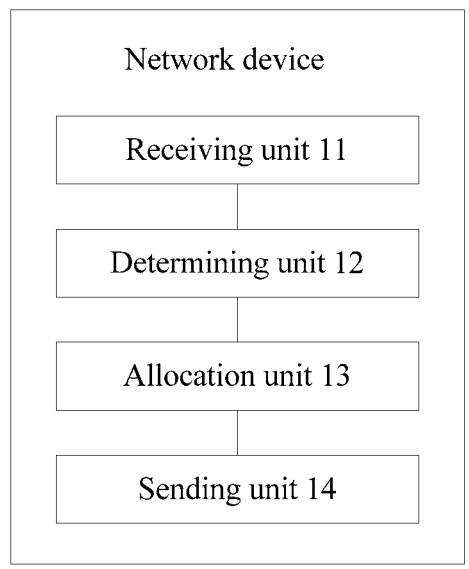
FIG. 5 is a schematic structural diagram of a network device according to an embodiment of the present application.

An embodiment of the present application provides a network device. As shown in FIG. 5, the network device includes a receiving unit 11, a determining unit 12, an allocation unit 13, and a sending unit 14.

The receiving unit 11 is configured to receive a transmission resource request sent by a first terminal device.

The determining unit 12 is configured to determine a quantity of transmission times in response to the transmission resource request received by the receiving unit 11.

The allocation unit 13 is configured to allocate a resource set to the first terminal device according to the quantity of transmission times determined by the determining unit 12, where a quantity of resources included in the resource set is equal to the quantity of transmission times, and the resources are a set of one or more physical resource blocks used by the first terminal device to send a to-be-transmitted service data packet.

The sending unit 14 is configured to send, to the first terminal device, time-frequency resource location information of each resource in the resource set allocated by the allocation unit 13.

In this embodiment of the present application, further, the determining unit 12 is specifically configured to determine the quantity of transmission times according to a load status of a current cell.

In this embodiment of the present application, further, the determining unit 12 is specifically configured to determine the quantity of transmission times according to a quantity of available resources in a next scheduling period, a quantity of resources required in the next scheduling period, and a preset threshold.

In this embodiment of the present application, further, the quantity of available resources in the next scheduling period, the quantity of resources required in the next scheduling period, and the preset threshold that are used when the determining unit 12 determines the quantity of transmission times meet the following conditions:

a ratio of the quantity of resources required in the next scheduling period to the quantity of available resources in the next scheduling period is less than the preset threshold; and the quantity of transmission times is obtained according to the quantity of resources required in the next scheduling period and a quantity of terminal devices that need to be scheduled in the next scheduling period.

In this embodiment of the present application, further, the determining unit 12 is specifically configured to determine the quantity of transmission times according to a load status of a current cell and first information of the first terminal device, where the first information of the first terminal device includes at least one of the following: a level of the first terminal device, a service type of the first terminal device, or a quality of service QoS requirement of the first terminal device.

In this embodiment of the present application, further, the sending unit 14 is further configured to broadcast the quantity of transmission times in the current cell, or send the quantity of transmission times to the first terminal device.

In this embodiment of the present application, further, the sending unit 14 is specifically configured to broadcast, in the current cell, the quantity of transmission times by using a system broadcast message, radio resource control (English: Radio Resource Control, RRC for short) signaling, or a common control channel.

In this embodiment of the present application, further, the sending unit 14 is specifically configured to: send the quantity of transmission times to the first terminal device by using dedicated RRC signaling or a dedicated control channel.

The network device provided by this embodiment of the present application first determines a quantity of transmission times in response to a received transmission resource request sent by a first terminal device, then allocates, to the first terminal device according to the determined quantity of transmission times, a resource set including a quantity of resources that is equal to the quantity of transmission times, and sends time-frequency resource location information of each resource in the resource set to the first terminal device, so that the first terminal device sends a to-be-transmitted service data packet according to the time-frequency resource location information of each resource in the resource set. In this way, the network device flexibly configures the quantity of transmission times, a probability that transmission resources in which time resources are the same and frequency resources are the same or in which time resources are the same and frequency resources are adjacent are allocated to different terminal devices is reduced, and therefore, overall system performance is improved.

Figure 6:
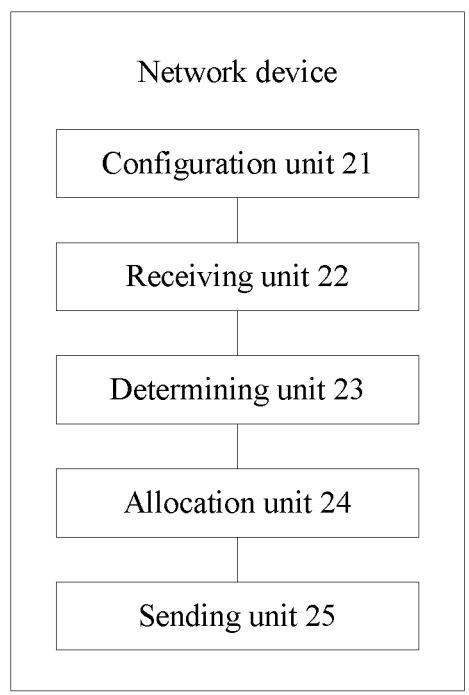
FIG. 6 is a schematic structural diagram of a network device according to another embodiment of the present application.

Another embodiment of the present application provides a network device. As shown in FIG. 6, the network device includes a configuration unit 21, a receiving unit 22, a determining unit 23, an allocation unit 24, and a sending unit 25.

The configuration unit 21 is configured to configure at least two resource pools, and configure a corresponding quantity of transmission times for each resource pool in the at least two resource pools, where quantities of transmission times configured for different resource pools are different.

The receiving unit 22 is configured to receive a transmission resource request sent by a first terminal device.

The determining unit 23 is configured to determine, according to a load status of a current cell and first information of the first terminal device and in response to the transmission resource request received by the receiving unit 22, a first resource pool from the at least two resource pools configured by the configuration unit 21.

The allocation unit 24 is configured to allocate a resource set from the first resource pool determined by the determining unit 23 to the first terminal device, where the first information of the first terminal device includes at least one of the following: a level of the first terminal device, a service type of the first terminal device, or a quality of service QoS requirement of the first terminal device, a quantity of resources included in the resource set is equal to a quantity of transmission times configured for the first resource pool, and the resources are a set of one or more physical resource blocks used by the first terminal device to send a to-be-transmitted service data packet.

The sending unit 25 is configured to send, to the first terminal device, time-frequency resource location information of each resource in the resource set allocated by the allocation unit 24.

In this embodiment of the present application, further, the sending unit 25 is further configured to broadcast, in the current cell, configuration information of each resource pool in the at least two resource pools after the configuration unit 21 configures the at least two resource pools and configures the corresponding quantity of transmission times for each resource pool in the at least two resource pools, where the configuration information of the resource pool includes a quantity of transmission times configured for the resource pool.

The network device provided by this embodiment of the present application first configures at least two resource pools, and configures a corresponding quantity of transmission times for each resource pool in the at least two resource pools, then after receiving a transmission resource request sent by a first terminal device, determines a first resource pool from the at least two resource pools according to a load status of a current cell and first information of the first terminal device and in response to the transmission resource request, allocates a resource set from the first resource pool to the first terminal device, and finally sends time-frequency resource location information of each resource in the resource set to the first terminal device, so that the first terminal device sends a to-be-transmitted service data packet according to the time-frequency resource location information of each resource in the resource set. In this way, by configuring multiple resource pools with different quantities of transmission times, the network device implements flexible configuration of the quantities of transmission times, a probability that transmission resources in which time resources are the same and frequency resources are the same or in which time resources are the same and frequency resources are adjacent are allocated to different terminal devices is reduced, and therefore, overall system performance is improved.

Figure 7:
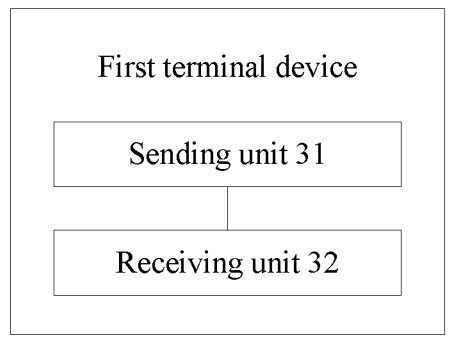
FIG. 7 is a schematic structural diagram of a first terminal device according to another embodiment of the present application.

Another embodiment of the present application provides a first terminal device. As shown in FIG. 7, the first terminal device includes a sending unit 31 and a receiving unit 32.

The sending unit 31 is configured to send a transmission resource request to a network device.

The receiving unit 32 is configured to receive time-frequency resource location information of each resource in a resource set sent by the network device, where a quantity of resources included in the resource set is equal to a quantity of transmission times, the resources are a set of one or more physical resource blocks used by the first terminal device to send a to-be-transmitted service data packet, and the quantity of transmission times is determined by the network device.

The sending unit 31 is further configured to send, according to the time-frequency resource location information of each resource in the resource set received by the receiving unit 32, the to-be-transmitted service data packet to a second terminal device by using each resource in the resource set.

In this embodiment of the present application, further, the receiving unit 32 is further configured to receive the quantity of transmission times sent by the network device.

In this embodiment of the present application, further, the receiving unit 32 is specifically configured to: receive the quantity of transmission times broadcast by the network device by using a system broadcast message, radio resource control RRC signaling, or a common control channel; or receive the quantity of transmission times sent by the network device by using dedicated RRC signaling or a dedicated control channel.

In this embodiment of the present application, further, the sending unit 31 is further configured to send scheduling assignment SA information to the second terminal device before sending, according to the time-frequency resource location information of each resource in the resource set, the to-be-transmitted service data packet to the second terminal device by using each resource in the resource set, where the SA information carries the quantity of transmission times.

In this embodiment of the present application, further, the sending unit 31 indicates the quantity of transmission times by using indication information added in the SA information.

In this embodiment of the present application, further, the sending unit 31 indicates the quantity of transmission times by using a demodulation reference signal (DMRS) of the SA information.

Figure 8:
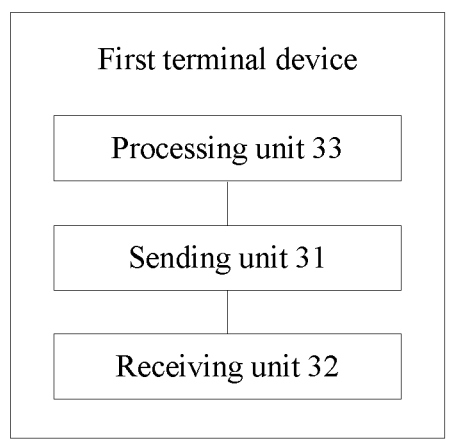
FIG. 8 is another schematic structural diagram of a first terminal device according to another embodiment of the present application.

As shown in FIG. 8, the first terminal device further includes a processing unit 33.

The processing unit 33 is configured to set, before the sending unit 31 sends the scheduling assignment SA information to the second terminal device, one or a combination of a cell identity (Cell), a cyclic shift (CS), or an orthogonal cover code (OCC) of the SA information corresponding to the quantity of transmission times, and generate the DMRS of the SA information.

In this embodiment of the present application, further, the sending unit 31 indicates the quantity of transmission times by using a scrambling sequence of the SA information.

As shown in FIG. 8, the first terminal device further includes a processing unit 33.

The processing unit 33 is configured to set, before the sending unit 31 sends the scheduling assignment SA information to the second terminal device, a cell ID and/or a radio network temporary identifier (RNTI) of the SA information corresponding to the quantity of transmission times, generate the scrambling sequence of the SA information, and scramble the SA information according to the scrambling sequence.

In this embodiment of the present application, further, the sending unit 31 indicates the quantity of transmission times by using a mask.

As shown in FIG. 8, the first terminal device further includes a processing unit 33.

The processing unit 33 is configured to multiply, before the sending unit 31 sends the scheduling assignment SA information to the second terminal device, a cyclic redundancy check (CRC) of the SA information by the mask corresponding to the quantity of transmission times.

The first terminal device provided by this embodiment of the present application can receive, after sending a transmission resource request to a network device, time-frequency resource location information of each resource in a resource set sent by the network device, where the resource set is allocated to the first terminal device according to a determined quantity of transmission times and includes a quantity of resources that is equal to the quantity of transmission times, and further send a to-be-transmitted service data packet according to the time-frequency resource location information of each resource in the resource set. In this way, the network device flexibly configures the quantity of transmission times, a probability that transmission resources in which time resources are the same and frequency resources are the same or in which time resources are the same and frequency resources are adjacent are allocated to different terminal devices is reduced, and therefore, overall system performance is improved.

Figure 9:
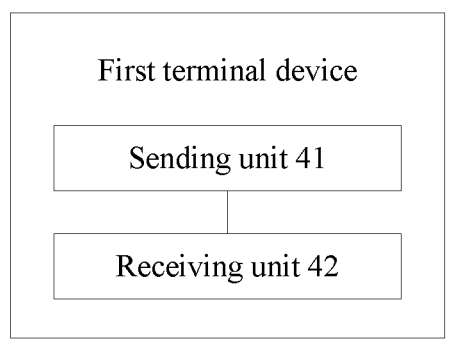
FIG. 9 is a schematic structural diagram of a first terminal device according to another embodiment of the present application.

Another embodiment of the present application provides a first terminal device. As shown in FIG. 9, the first terminal device includes a sending unit 41 and a receiving unit 42.

The sending unit 41 is configured to send a transmission resource request to a network device.

The receiving unit 42 is configured to receive time-frequency resource location information of each resource in a resource set sent by the network device, where a quantity of resources included in the resource set is equal to a quantity of transmission times configured for a first resource pool, the resources are a set of one or more physical resource blocks used by the first terminal device to send a to-be-transmitted service data packet, the first resource pool is determined by the network device from at least two configured resource pools according to a load status of a current cell and first information of the first terminal device, quantities of transmission times corresponding to resource pools in the at least two resource pools are different, and the first information of the first terminal device includes at least one of the following: a level of the first terminal device, a service type of the first terminal device, or a quality of service QoS requirement of the first terminal device.

The sending unit 41 is further configured to send, according to the time-frequency resource location information of each resource in the resource set received by the receiving unit 42, the to-be-transmitted service data packet to a second terminal device by using each resource in the resource set.

In this embodiment of the present application, further, the receiving unit 42 is further configured to receive configuration information of each resource pool in the at least two resource pools, sent by the network device, where the configuration information of the resource pool includes a quantity of transmission times configured for the resource pool.

The first terminal device provided by this embodiment of the present application can receive, after sending a transmission resource request to a network device, time-frequency resource location information of each resource in a resource set sent by the network device, where the resource set is allocated to the first terminal device according to a quantity of transmission times configured for a first resource pool and includes a quantity of resources that is equal to the quantity of transmission times, and further send a to-be-transmitted service data packet according to the time-frequency resource location information of each resource in the resource set, where the first resource pool is determined by the network device from at least two configured resource pools according to a load status of a current cell and first information of the first terminal device. In this way, by configuring multiple resource pools with different quantities of transmission times, the network device implements flexible configuration of the quantities of transmission times, a probability that transmission resources in which time resources are the same and frequency resources are the same or in which time resources are the same and frequency resources are adjacent are allocated to different terminal devices is reduced, and therefore, overall system performance is improved.

Figure 10:
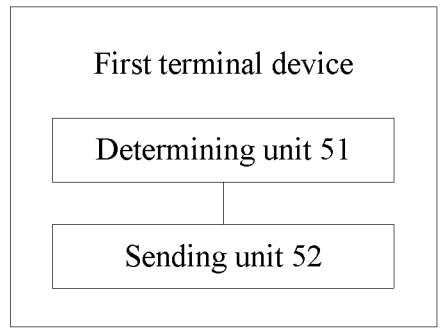
FIG. 10 is a schematic structural diagram of a first terminal device according to another embodiment of the present application.

Another embodiment of the present application provides a first terminal device. As shown in FIG. 10, the first terminal device includes a determining unit 51 and a sending unit 52.

The determining unit 51 is configured to determine a first resource pool according to first information of the first terminal device, where the first resource pool is one of at least two preconfigured resource pools, different quantities of transmission times are configured for resource pools in the at least two resource pools, and the first information of the first terminal device includes at least one of the following: a level of the first terminal device, a service type of the first terminal device, or a quality of service QoS requirement of the first terminal device; and determine a resource set from the first resource pool according to a quantity of transmission times configured for the first resource pool, where a quantity of resources included in the resource set is equal to the quantity of transmission times configured for the first resource pool, and the resources are a set of one or more physical resource blocks used by the first terminal device to send a to-be-transmitted service data packet.

The sending unit 52 is configured to send the to-be-transmitted service data packet to a second terminal device by using each resource in the resource set determined by the determining unit 51.

The first terminal device provided by this embodiment of the present application can first determine a first resource pool from at least two preconfigured resource pools according to first information of the first terminal device, then determine, according to a quantity of transmission times configured for the first resource pool, a resource set including a quantity of resources that is equal to the quantity of transmission times, and further send a to-be-transmitted service data packet to a second terminal device by using each resource in the resource set. In this way, by preconfiguring multiple resource pools with different quantities of transmission times, flexible configuration of the quantities of transmission times is implemented, a probability that different terminal devices select transmission resources in which time resources are the same and frequency resources are the same or in which time resources are the same and frequency resources are adjacent is reduced, and therefore, overall system performance is improved.

Figure 11:
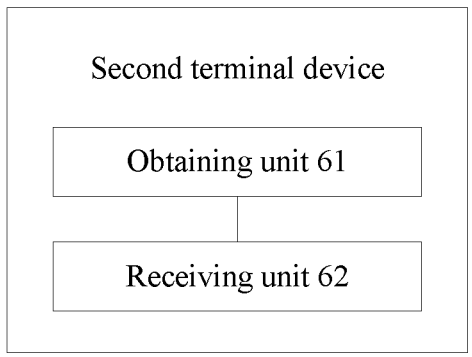
FIG. 11 is a schematic structural diagram of a second terminal device according to another embodiment of the present application.

Another embodiment of the present application provides a second terminal device. As shown in FIG. 11, the second terminal device includes an obtaining unit 61 and a receiving unit 62.

The obtaining unit 61 is configured to obtain a quantity of transmission times.

The receiving unit 62 is configured to receive, according to the quantity of transmission times obtained by the obtaining unit 61, a to-be-transmitted service data packet sent by a first terminal device by using each resource in a resource set, where a quantity of resources included in the resource set is equal to the quantity of transmission times, and the resources are a set of one or more physical resource blocks.

In this embodiment of the present application, further, the obtaining unit 61 is specifically configured to receive the quantity of transmission times broadcast by a network device by using a system broadcast message, radio resource control RRC signaling, or a common control channel.

In this embodiment of the present application, further, the receiving unit 62 is further configured to receive, before the obtaining unit 61 obtains the quantity of transmission times, scheduling assignment SA information sent by the first terminal device, where the SA information carries the quantity of transmission times.

In this embodiment of the present application, further, indication information added in the SA information received by the receiving unit 62 is used to indicate the quantity of transmission times.

The obtaining unit 61 is specifically configured to determine the quantity of transmission times according to the indication information.

In this embodiment of the present application, further, a demodulation reference signal DMRS of the SA information received by the receiving unit 62 is used to indicate the quantity of transmission times.

The obtaining unit 61 is specifically configured to obtain the DMRS of the SA information, and determine the quantity of transmission times based on one or a combination of a cell identity cell ID, a cyclic shift CS, or an orthogonal cover code OCC in the DMRS.

In this embodiment of the present application, further, a scrambling sequence of the SA information received by the receiving unit 62 is used to indicate the quantity of transmission times.

The obtaining unit 61 is specifically configured to descramble the SA information, obtain the scrambling sequence of the SA information, and determine the quantity of transmission times according to a cell ID and/or a radio network temporary identifier RNTI in the scrambling sequence.

In this embodiment of the present application, further, a mask received by the receiving unit 62 is used to indicate the quantity of transmission times.

The obtaining unit 61 is specifically configured to obtain a cyclic redundancy check CRC of the SA information, and determine the quantity of transmission times according to the mask corresponding to the CRC.

In this embodiment of the present application, further, the obtaining unit 61 is specifically configured to determine, according to configuration information of a currently monitored first resource pool, that a quantity of transmission times configured for the first resource pool is the quantity of transmission times, where the configuration information of the first resource pool includes the quantity of transmission times configured for the first resource pool.

In this embodiment of the present application, further, the first resource pool currently monitored by the obtaining unit 61 is one of at least two preconfigured resource pools.

In this embodiment of the present application, further, the first resource pool currently monitored by the obtaining unit 61 is one of at least two resource pools configured by a network device.

The receiving unit 62 is further configured to receive, before the obtaining unit 61 determines, according to the configuration information of the currently monitored first resource pool, the quantity of transmission times configured for the first resource pool, the configuration information of the first resource pool sent by the network device.

The second terminal device provided by this embodiment of the present application first obtains a quantity of transmission times, and then receives, according to the obtained quantity of transmission times, a to-be-transmitted service data packet sent by a first terminal device by using each resource in a resource set, where a quantity of resources included in the resource set is equal to the quantity of transmission times. In this way, the quantity of transmission times is flexibly configured, a probability that different terminal devices select transmission resources in which time resources are the same and frequency resources are the same or in which time resources are the same and frequency resources are adjacent is reduced, and therefore, overall system performance is improved.

Figure 12:
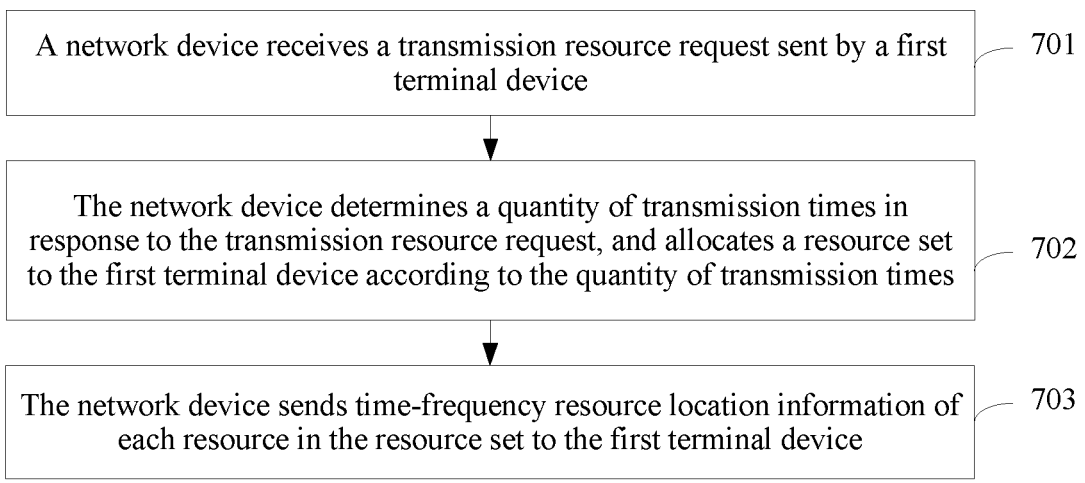
FIG. 12 is a flowchart of a resource allocation method according to another embodiment of the present application.

An embodiment of the present application provides a resource allocation method. As shown in FIG. 12, the method may include the following steps.

701. A network device receives a transmission resource request sent by a first terminal device.

In a communications system assisted by a network device, when the first terminal device needs to send a to-be-transmitted service data packet to a nearby second terminal device, the first terminal device may first send the transmission resource request to the network device to request transmission resources from the network device. In this case, the network device may receive the transmission resource request sent by the first terminal device. In addition, the first terminal device may report status information of the first terminal device such as a buffer status to the network device, so as to assist the network device in allocating transmission resources to the first terminal device according to the status information.

702. The network device determines a quantity of transmission times in response to the transmission resource request, and allocates a resource set to the first terminal device according to the quantity of transmission times.

A quantity of resources included in the resource set is equal to the quantity of transmission times, and the resources are a set of one or more physical resource blocks used by the first terminal device to send the to-be-transmitted service data packet.

Specifically, to avoid occurrence of a problem that when multiple terminal devices need to transmit service data packets simultaneously, overall system performance is degraded because all the terminal devices need to use fixed four-time transmission to transmit the to-be-transmitted service data packets but available transmission resources are limited, after the network device receives the transmission resource request and the status information that are sent by the first terminal device, the network device may first determine the quantity of transmission times in response to the transmission resource request, and allocate, to the first terminal device according to the determined quantity of transmission times and the status information, the resource set including the quantity of resources that is equal to the quantity of transmission times.

703. The network device sends time-frequency resource location information of each resource in the resource set to the first terminal device.

After the network device determines the quantity of transmission times and allocates the resource set to the first terminal device according to the quantity of transmission times, the network device may send the time-frequency resource location information of each resource in the resource set to the first terminal device, so that the first terminal device sends the to-be-transmitted service data packet according to the time-frequency resource location information of each resource in the resource set.

According to the resource allocation method provided by this embodiment of the present application, a network device first determines a quantity of transmission times in response to a received transmission resource request sent by a first terminal device, then allocates, to the first terminal device according to the determined quantity of transmission times, a resource set including a quantity of resources that is equal to the quantity of transmission times, and sends time-frequency resource location information of each resource in the resource set to the first terminal device, so that the first terminal device sends a to-be-transmitted service data packet according to the time-frequency resource location information of each resource in the resource set. In this way, the network device flexibly configures the quantity of transmission times, a probability that transmission resources in which time resources are the same and frequency resources are the same or in which time resources are the same and frequency resources are adjacent are allocated to different terminal devices is reduced, and therefore, overall system performance is improved.

In this embodiment of the present application, further, in a first possible implementation, in a scenario in which a quantity of transmission times may be configured at a cell level, that is, when the network device configures a same quantity of transmission times for all terminal devices in a same cell, that the network device determines a quantity of transmission times in step 702 may specifically include: the network device determines the quantity of transmission times according to a load status of a current cell.

In this embodiment of the present application, further, that the network device determines the quantity of transmission times according to a load status of a current cell may specifically include: the network device determines the quantity of transmission times according to a quantity of available resources in a next scheduling period, a quantity of resources required in the next scheduling period, and a preset threshold.

In this embodiment of the present application, further, in a possible implementation, the quantity of available resources in the next scheduling period, the quantity of resources required in the next scheduling period, and the preset threshold meet the following conditions:

a ratio of the quantity of resources required in the next scheduling period to the quantity of available resources in the next scheduling period is less than the preset threshold; and the quantity of transmission times is obtained according to the quantity of resources required in the next scheduling period and a quantity of terminal devices that need to be scheduled in the next scheduling period.

In this embodiment of the present application, further, in a second possible implementation, in a scenario in which a quantity of transmission times may be configured at a user level, that is, when the network device configures different quantities of transmission times for different terminal devices in a same cell, that the network device determines a quantity of transmission times in step 702 may specifically include: the network device determines the quantity of transmission times according to a load status of a current cell and first information of the first terminal device.

The first information of the first terminal device may include at least one of the following: a level of the first terminal device, a service type of the first terminal device, or a QoS requirement of the first terminal device.

It should be noted that, in this embodiment of the present application, only the first information of the first terminal device is described as an example, and the first information of the first terminal device in this embodiment of the present application includes but is not limited to the level of the first terminal device, the service type of the first terminal device, and the QoS requirement of the first terminal device.

In this embodiment of the present application, further, the resource transmission method may further include: the network device broadcasts the quantity of transmission times in the current cell; or the network device sends the quantity of transmission times to the first terminal device.

In this embodiment of the present application, further, that the network device broadcasts the quantity of transmission times in the current cell may specifically include: the network device broadcasts, in the current cell, the quantity of transmission times by using a system broadcast message, RRC signaling, or a common control channel.

In this embodiment of the present application, further, that the network device sends the quantity of transmission times to the first terminal device may specifically include: the network device sends the quantity of transmission times to the first terminal device by using dedicated RRC signaling or a dedicated control channel.

Figure 13:
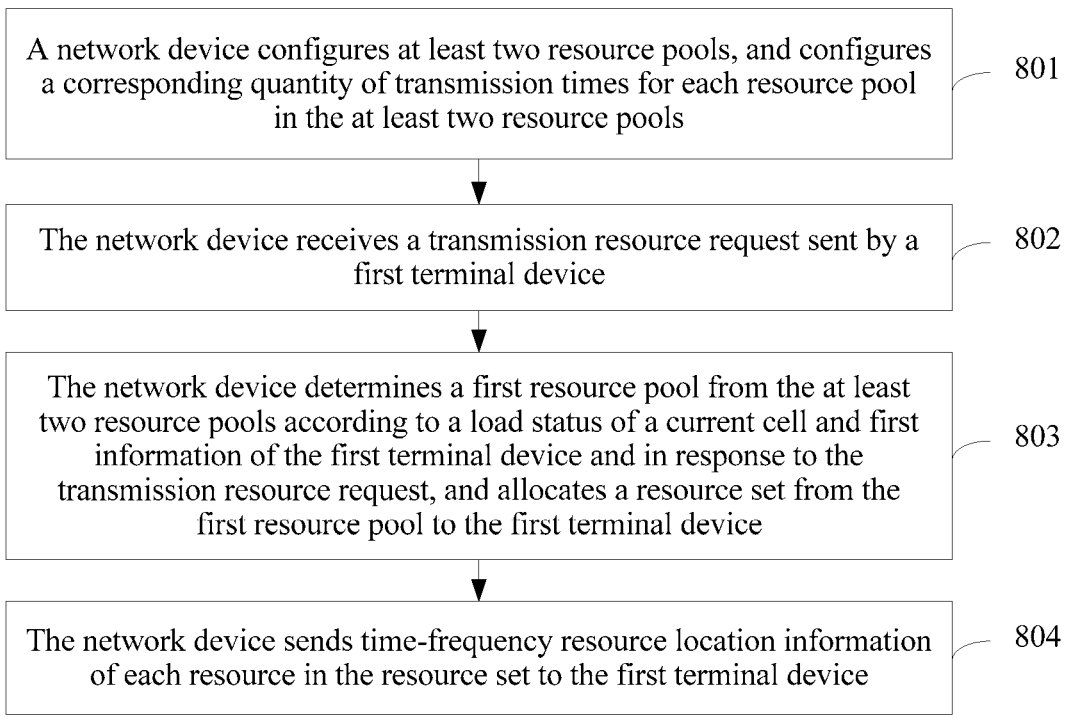
FIG. 13 is a flowchart of a resource allocation method according to another embodiment of the present application.

Another embodiment of the present application provides a resource allocation method. As shown in FIG. 13, the method may include the following steps.

801. A network device configures at least two resource pools, and configures a corresponding quantity of transmission times for each resource pool in the at least two resource pools.

Quantities of transmission times configured for different resource pools are different. In a communications system assisted by a network device, to implement flexible configuration of the quantity of transmission times, the network device may configure at least two resource pools for the communications system, and configure different quantities of transmission times for resource pools in the at least two resource pools.

802. The network device receives a transmission resource request sent by a first terminal device.

In addition, the first terminal device may report status information of the first terminal device such as a buffer status to the network device, so as to assist the network device in allocating transmission resources to the first terminal device according to the status information.

803. The network device determines a first resource pool from the at least two resource pools according to a load status of a current cell and first information of the first terminal device and in response to the transmission resource request, and allocates a resource set from the first resource pool to the first terminal device.

The first information of the first terminal device may include at least one of the following: a level of the first terminal device, a service type of the first terminal device, or a QoS requirement of the first terminal device. A quantity of resources included in the resource set is equal to a quantity of transmission times configured for the first resource pool, and the resources are a set of one or more physical resource blocks used by the first terminal device to send a to-be-transmitted service data packet.

It should be noted that, in this embodiment of the present application, only the first information of the first terminal device is described as an example, and the first information of the first terminal device in this embodiment of the present application includes but is not limited to the level of the first terminal device, the service type of the first terminal device, and the QoS requirement of the first terminal device.

Specifically, after the network device receives the transmission resource request and the status information that are sent by the first terminal device, the network device may first determine, from the at least two configured resource pools, the first resource pool for the first terminal device according to the load status of the current cell and the first information of the first terminal device and in response to the transmission resource request, and allocate the resource set from the first resource pool to the first terminal device, where the quantity of resources in the resource set is equal to the quantity of transmission times configured for the first resource pool.

For example, the network device may first select multiple first resource pools from the at least two resource pools according to the load status of the current cell, and then determine, from the multiple first resource pools according to the first information of the first terminal device, a first resource pool used for the first terminal device to transmit the to-be-transmitted service data packet. For the method in which the network device selects multiple first resource pools according to the load status of the current cell, refer to corresponding content in the embodiment shown in FIG. 12 of the present application. Details are not described again herein in this embodiment of the present application.

804. The network device sends time-frequency resource location information of each resource in the resource set to the first terminal device.

According to the resource allocation method provided by this embodiment of the present application, a network device first configures at least two resource pools, and configures a corresponding quantity of transmission times for each resource pool in the at least two resource pools, then after receiving a transmission resource request sent by a first terminal device, determines a first resource pool from the at least two resource pools according to a load status of a current cell and first information of the first terminal device and in response to the transmission resource request, allocates a resource set from the first resource pool to the first terminal device, and finally sends time-frequency resource location information of each resource in the resource set to the first terminal device, so that the first terminal device sends a to-be-transmitted service data packet according to the time-frequency resource location information of each resource in the resource set. In this way, by configuring multiple resource pools with different quantities of transmission times, the network device implements flexible configuration of the quantities of transmission times, a probability that transmission resources in which time resources are the same and frequency resources are the same or in which time resources are the same and frequency resources are adjacent are allocated to different terminal devices is reduced, and therefore, overall system performance is improved.

In this embodiment of the present application, further, after step 801, the resource allocation may further include: the network device broadcasts, in the current cell, configuration information of each resource pool in the at least two resource pools, where the configuration information of the resource pool includes a quantity of transmission times configured for the resource pool.

Figure 14:
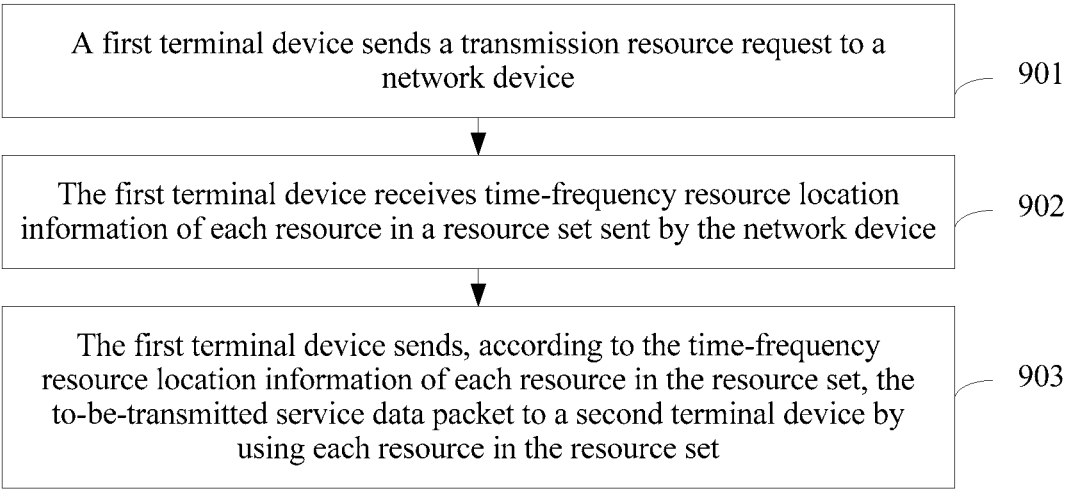
FIG. 14 is a flowchart of a resource allocation method according to another embodiment of the present application.

Another embodiment of the present application provides a resource allocation method. As shown in FIG. 14, the method may include the following steps.

901. A first terminal device sends a transmission resource request to a network device.

In a communications system assisted by a network device, when the first terminal device needs to send a to-be-transmitted service data packet to a nearby second terminal device, the first terminal device may first send the transmission resource request to the network device, so that the network device can allocate a resource set to the first terminal device in response to the transmission resource request.

902. The first terminal device receives time-frequency resource location information of each resource in a resource set sent by the network device.

A quantity of resources included in the resource set is equal to a quantity of transmission times, the resources are a set of one or more physical resource blocks used by the first terminal device to send a to-be-transmitted service data packet, and the quantity of transmission times is determined by the network device.

Specifically, after the network device receives the transmission resource request sent by the first terminal device, the network device first determines the quantity of transmission times, allocates the resource set to the first terminal device according to the quantity of transmission times, and sends the time-frequency resource location information of each resource in the resource set to the first terminal device. In this case, the first terminal device may receive the time-frequency resource location information of each resource in the resource set sent by the network device.

903. The first terminal device sends, according to the time-frequency resource location information of each resource in the resource set, the to-be-transmitted service data packet to a second terminal device by using each resource in the resource set.

After the first terminal device receives the time-frequency resource location information of each resource in the resource set sent by the network device, the first terminal device may send the to-be-transmitted service data packet to the second terminal device according to the time-frequency resource location information of each resource in the resource set by using each resource in the resource set.

According to the resource allocation method provided by this embodiment of the present application, a first terminal device can receive, after sending a transmission resource request to a network device, time-frequency resource location information of each resource in a resource set sent by the network device, where the resource set is allocated to the first terminal device according to a determined quantity of transmission times and includes a quantity of resources that is equal to the quantity of transmission times, and further send a to-be-transmitted service data packet according to the time-frequency resource location information of each resource in the resource set. In this way, the network device flexibly configures the quantity of transmission times, a probability that transmission resources in which time resources are the same and frequency resources are the same or in which time resources are the same and frequency resources are adjacent are allocated to different terminal devices is reduced, and therefore, overall system performance is improved.

In this embodiment of the present application, further, the resource allocation method may further include: the first terminal device receives the quantity of transmission times sent by the network device.

In this embodiment of the present application, further, in a scenario in which a quantity of transmission times may be configured at a cell level, that is, when the network device configures a same quantity of transmission times for all terminal devices in a same cell, that the first terminal device receives the quantity of transmission times sent by the network device may specifically include: the first terminal device receives the quantity of transmission times broadcast by the network device by using a system broadcast message, RRC signaling, or a common control channel. Alternatively, in a scenario in which a quantity of transmission times may be configured at a user level, that is, when the network device configures different quantities of transmission times for different terminal devices in a same cell, that the first terminal device receives the quantity of transmission times sent by the network device may specifically include: the first terminal device receives the quantity of transmission times sent by the network device by using dedicated RRC signaling or a dedicated control channel.

In this embodiment of the present application, further, when the first terminal device receives the quantity of transmission times sent by the network device by using the system broadcast message, the RRC signaling, or the common control channel, to ensure that the second terminal device not located in a same cell as the first terminal device can learn the quantity of transmission times used by the first terminal device to send the to-be-transmitted service data packet, or when the first terminal device receives the quantity of transmission times sent by the network device by using the dedicated RRC signaling or the dedicated control channel, to ensure that the second terminal device (which may be a terminal device located in a same cell as the first terminal device, or may be a terminal device not located in a same cell as the first terminal device) can learn the quantity of transmission times used by the first terminal device to send the to-be-transmitted service data packet, before step 903, the resource allocation may further include: the first terminal device sends SA information to the second terminal device, where the SA information carries the quantity of transmission times.

The quantity of transmission times may be indicated in multiple manners. Several solutions provided by this embodiment of the present application may specifically include the following four manners:

In this embodiment of the present application, further, in a first possible implementation, indication information added in the SA information is used to indicate the quantity of transmission times.

In this embodiment of the present application, further, in a second possible implementation, a DMRS of the SA information is used to indicate the quantity of transmission times.

In this case, before the first terminal device sends the SA information to the second terminal device, the resource allocation method may further include: setting one or a combination of a cell ID, a CS, or an OCC of the SA information corresponding to the quantity of transmission times, and generating the DMRS of the SA information.

In this embodiment of the present application, further, in a third possible implementation, a scrambling sequence of the SA information is used to indicate the quantity of transmission times.

In this case, before the first terminal device sends the SA information to the second terminal device, the resource allocation method may further include: setting a cell ID and/or an RNTI of the SA information corresponding to the quantity of transmission times, generating the scrambling sequence of the SA information, and scrambling the SA information according to the scrambling sequence.

In this embodiment of the present application, further, in a fourth possible implementation, a mask is used to indicate the quantity of transmission times.

In this case, before the first terminal device sends the SA information to the second terminal device, the resource allocation method may further include: multiplying a CRC of the SA information by the mask corresponding to the quantity of transmission times.

Figure 15:
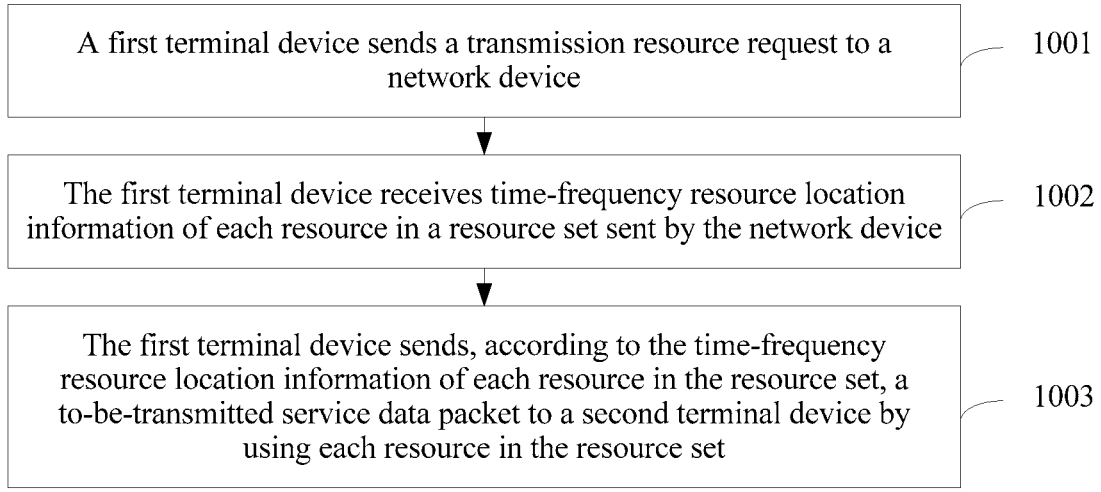
FIG. 15 is a flowchart of a resource allocation method according to another embodiment of the present application.

Another embodiment of the present application provides a resource allocation method. As shown in FIG. 15, the method may include the following steps.

1001. A first terminal device sends a transmission resource request to a network device.

1002. The first terminal device receives time-frequency resource location information of each resource in a resource set sent by the network device.

A quantity of resources included in the resource set is equal to a quantity of transmission times configured for a first resource pool, and the resources are a set of one or more physical resource blocks used by the first terminal device to send a to-be-transmitted service data packet. The first resource pool is determined by the network device from at least two configured resource pools according to a load status of a current cell and first information of the first terminal device, and quantities of transmission times corresponding to resource pools in the at least two resource pools are different. The first information of the first terminal device may include at least one of the following: a level of the first terminal device, a service type of the first terminal device, or a QoS requirement of the first terminal device.

Specifically, after the network device receives the transmission resource request sent by the first terminal device, the network device first determines the first resource pool from the at least two configured resource pools according to the load status of the current cell and the first information of the first terminal device, allocates the resource set to the first terminal device according to the quantity of transmission times configured for the first resource pool, and sends the time-frequency resource location information of each resource in the resource set to the first terminal device. In this case, the first terminal device may receive the time-frequency resource location information of each resource in the resource set sent by the network device.

1003. The first terminal device sends, according to the time-frequency resource location information of each resource in the resource set, a to-be-transmitted service data packet to a second terminal device by using each resource in the resource set.

According to the resource allocation method provided by this embodiment of the present application, a first terminal device can receive, after sending a transmission resource request to a network device, time-frequency resource location information of each resource in a resource set sent by the network device, where the resource set is allocated to the first terminal device according to a quantity of transmission times configured for a first resource pool and includes a quantity of resources that is equal to the quantity of transmission times, and further send a to-be-transmitted service data packet according to the time-frequency resource location information of each resource in the resource set, where the first resource pool is determined by the network device from at least two configured resource pools according to a load status of a current cell and first information of the first terminal device. In this way, by configuring multiple resource pools with different quantities of transmission times, the network device implements flexible configuration of the quantities of transmission times, a probability that transmission resources in which time resources are the same and frequency resources are the same or in which time resources are the same and frequency resources are adjacent are allocated to different terminal devices is reduced, and therefore, overall system performance is improved.

In this embodiment of the present application, further, the resource allocation method may further include: the first terminal device receives configuration information of each resource pool in the at least two resource pools, sent by the network device, where the configuration information of the resource pool includes a quantity of transmission times configured for the resource pool.

Figure 16:
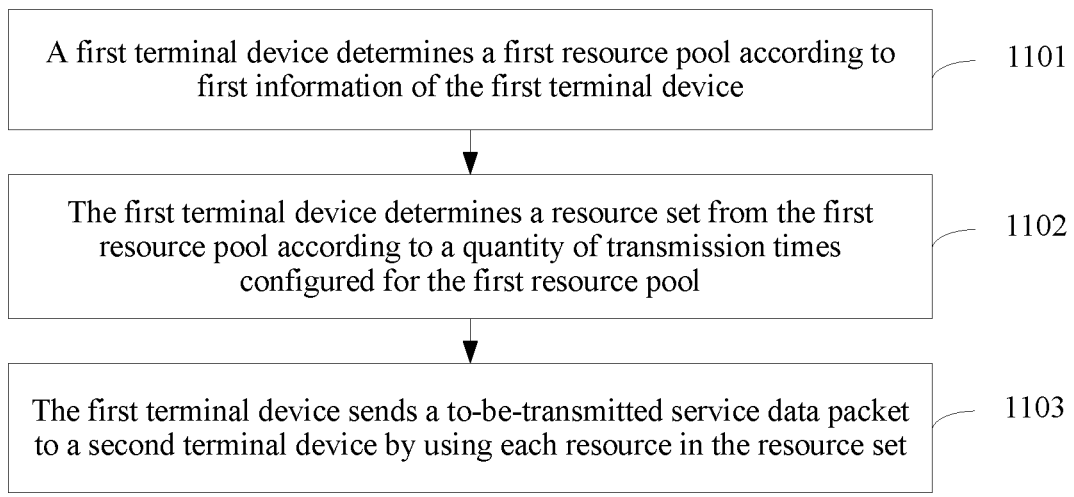
FIG. 16 is a flowchart of a resource allocation method according to another embodiment of the present application.

Another embodiment of the present application provides a resource allocation method. As shown in FIG. 16, the method includes the following steps.

1101. A first terminal device determines a first resource pool according to first information of the first terminal device.

The first resource pool is one of at least two preconfigured resource pools, and different quantities of transmission times are configured for resource pools in the at least two resource pools. The first information of the first terminal device may include at least one of the following: a level of the first terminal device, a service type of the first terminal device, or a QoS requirement of the first terminal device.

Specifically, at least two resource pools may be preconfigured for a communications system according to a protocol specification or in a predefined manner, and different quantities of transmission times are configured for the at least two resource pools. In this way, in a communications system not assisted by a network device, when the first terminal device sends a to-be-transmitted service data packet to a nearby second terminal device, the first terminal device may first determine the first resource pool according to the first information of the first terminal device.

For example, when the first terminal device is at a high level, a resource pool for which a configured quantity of transmission times is 4 may be determined as the first resource pool; when the first terminal device is at a low level, a resource pool for which a configured quantity of transmission times is 2 may be determined as the first resource pool.

1102. The first terminal device determines a resource set from the first resource pool according to a quantity of transmission times configured for the first resource pool.

A quantity of resources included in the resource set is equal to the quantity of transmission times configured for the first resource pool, and the resources are a set of one or more physical resource blocks used by the first terminal device to send a to-be-transmitted service data packet. After the first terminal device determines the first resource pool, the first terminal device may randomly select, from the first resource pool according to the quantity of transmission times configured for the first resource pool, the quantity of resources that is equal to the quantity of transmission times.

1103. The first terminal device sends a to-be-transmitted service data packet to a second terminal device by using each resource in the resource set.

After the first terminal device determines the resource set from the first resource pool, the first terminal device may send, according to time-frequency resource location information of each resource in the resource set, the to-be-transmitted service data packet to the second terminal device by using each resource in the resource set.

According to the resource allocation method provided by this embodiment of the present application, a first terminal device can first determine a first resource pool from at least two preconfigured resource pools according to first information of the first terminal device, then determine, according to a quantity of transmission times configured for the first resource pool, a resource set including a quantity of resources that is equal to the quantity of transmission times, and further send a to-be-transmitted service data packet to a second terminal device by using each resource in the resource set. In this way, by preconfiguring multiple resource pools with different quantities of transmission times, flexible configuration of the quantities of transmission times is implemented, a probability that different terminal devices select transmission resources in which time resources are the same and frequency resources are the same or in which time resources are the same and frequency resources are adjacent is reduced, and therefore, overall system performance is improved.

Figure 17:
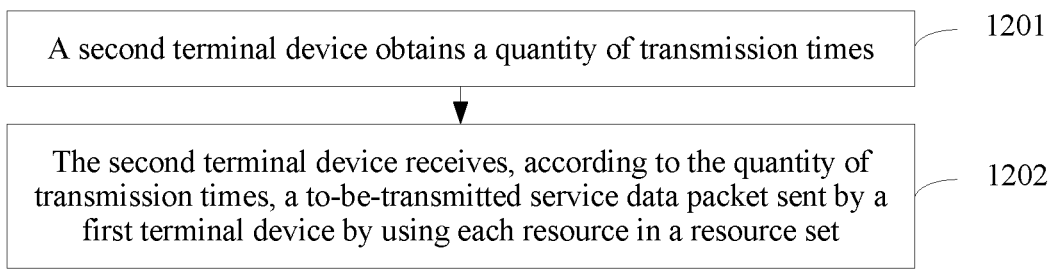
FIG. 17 is a flowchart of a resource allocation method according to another embodiment of the present application.

Another embodiment of the present application provides a resource allocation method. As shown in FIG. 17, the method may include the following steps.

1201. A second terminal device obtains a quantity of transmission times.

1202. The second terminal device receives, according to the quantity of transmission times, a to-be-transmitted service data packet sent by a first terminal device by using each resource in a resource set.

A quantity of resources included in the resource set is equal to the quantity of transmission times, and the resources are a set of one or more physical resource blocks.

According to the resource allocation method provided by this embodiment of the present application, a second terminal device first obtains a quantity of transmission times, and then receives, according to the obtained quantity of transmission times, a to-be-transmitted service data packet sent by a first terminal device by using each resource in a resource set, where a quantity of resources included in the resource set is equal to the quantity of transmission times. In this way, the quantity of transmission times is flexibly configured, a probability that different terminal devices select transmission resources in which time resources are the same and frequency resources are the same or in which time resources are the same and frequency resources are adjacent is reduced, and therefore, overall system performance is improved.

In this embodiment of the present application, further, when the second terminal device is a terminal device located in a same cell as the first terminal device, and in a scenario in which a quantity of transmission times may be configured at a cell level, that is, when a network device configures a same quantity of transmission times for all terminal devices in a same cell, in a possible implementation, step 1201 may specifically include: the second terminal device receives the quantity of transmission times broadcast by a network device by using a system broadcast message, RRC signaling, or a common control channel.

In this embodiment of the present application, further, when the second terminal device is a terminal device located in a same cell as the first terminal device, and in a scenario in which a quantity of transmission times may be configured at a user level, that is, when a network device configures different quantities of transmission times for different terminal devices in a same cell, or when the second terminal device is a terminal device not located in a same cell as the first terminal device, before step 1201, the resource allocation method may further include: the second terminal device receives SA information sent by the first terminal device, where the SA information carries the quantity of transmission times.

The quantity of transmission times may be indicated in multiple manners. In four solutions provided by this embodiment of the present application, step 1201 may specifically include four manners:

In this embodiment of the present application, further, in a first possible implementation, when indication information added in the SA information is used to indicate the quantity of transmission times, step 1201 may specifically include: the second terminal device determines the quantity of transmission times according to the indication information.

In this embodiment of the present application, further, in a second possible implementation, when a DMRS of the SA information is used to indicate the quantity of transmission times, step 1201 may specifically include: the second terminal device obtains the DMRS of the SA information, and determines the quantity of transmission times based on one or a combination of a cell ID, a CS, or an OCC in the DMRS.

In this embodiment of the present application, further, in a third possible implementation, when a scrambling sequence of the SA information is used to indicate the quantity of transmission times, step 1201 may specifically include: the second terminal device descrambles the SA information, obtains the scrambling sequence of the SA information, and determines the quantity of transmission times according to a cell ID and/or an RNTI in the scrambling sequence.

In this embodiment of the present application, further, in a fourth possible implementation, when a mask is used to indicate the quantity of transmission times, step 1201 may specifically include: the second terminal device obtains a CRC of the SA information, and determines the quantity of transmission times according to the mask corresponding to the CRC.

In this embodiment of the present application, further, in a scenario in which flexible configuration of the quantity of transmission times is implemented by configuring different quantities of transmission times for different resource pools, step 1201 may specifically include: the second terminal device determines, according to configuration information of a currently monitored first resource pool, that a quantity of transmission times configured for the first resource pool is the quantity of transmission times, where the configuration information of the first resource pool includes the quantity of transmission times configured for the first resource pool.

In this embodiment of the present application, further, in a scenario of preconfiguration, the first resource pool is one of at least two preconfigured resource pools.

In this embodiment of the present application, further, in a scenario of configuration by a network device, the first resource pool is one of at least two resource pools configured by the network device.

In this case, before the second terminal device determines, according to the configuration information of the currently monitored first resource pool, the quantity of transmission times configured for the first resource pool, the resource allocation method may further include: the second terminal device receives the configuration information of the first resource pool sent by the network device.

For ease of understanding by a person skilled in the art, in the present application, the resource allocation method provided by the present application is described in detail by using the following embodiments.

Figure 18A:
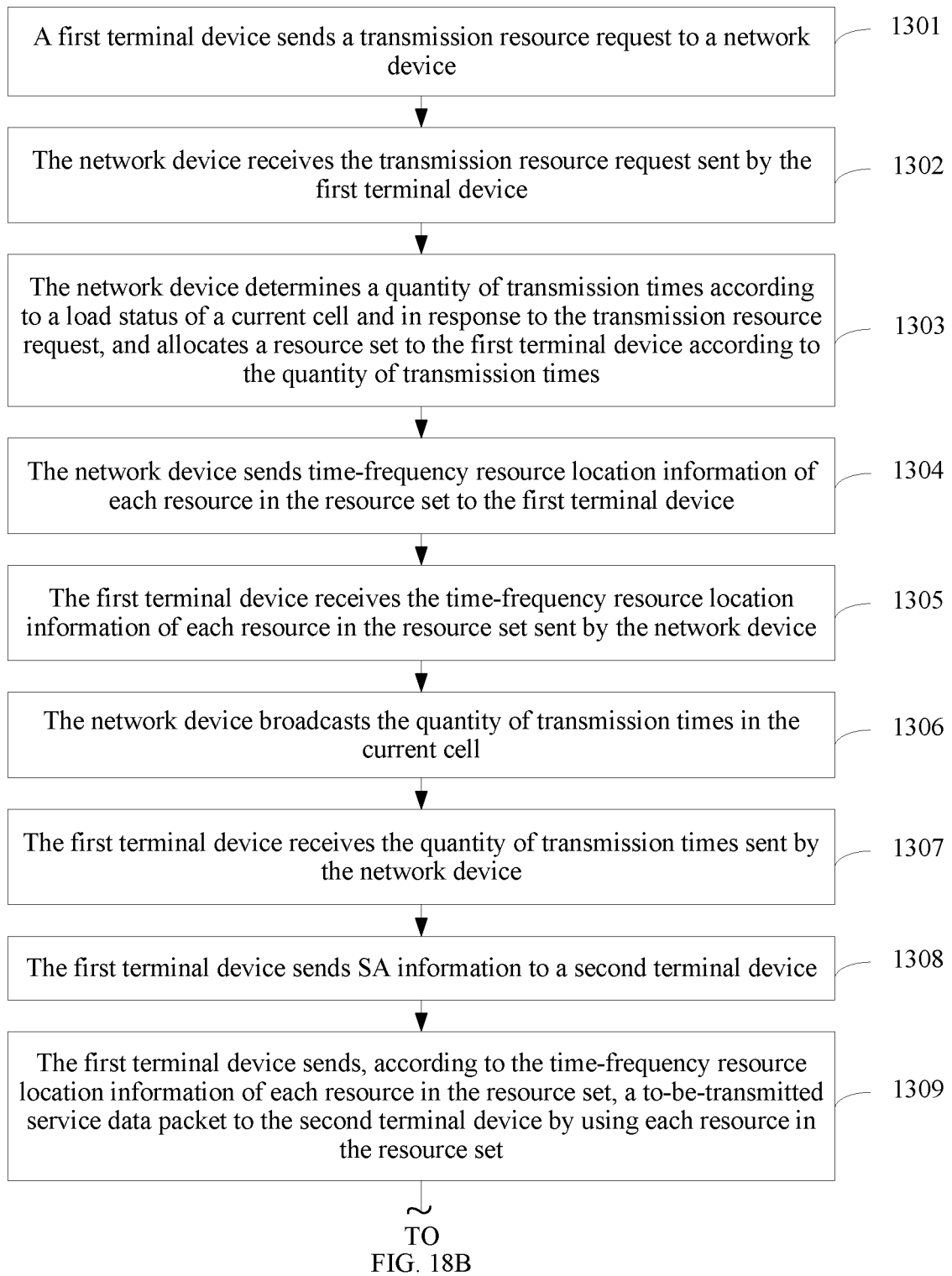
FIG. 18A and FIG. 18B are a flowchart of a resource allocation method according to another embodiment of the present application.
Figure 18B:
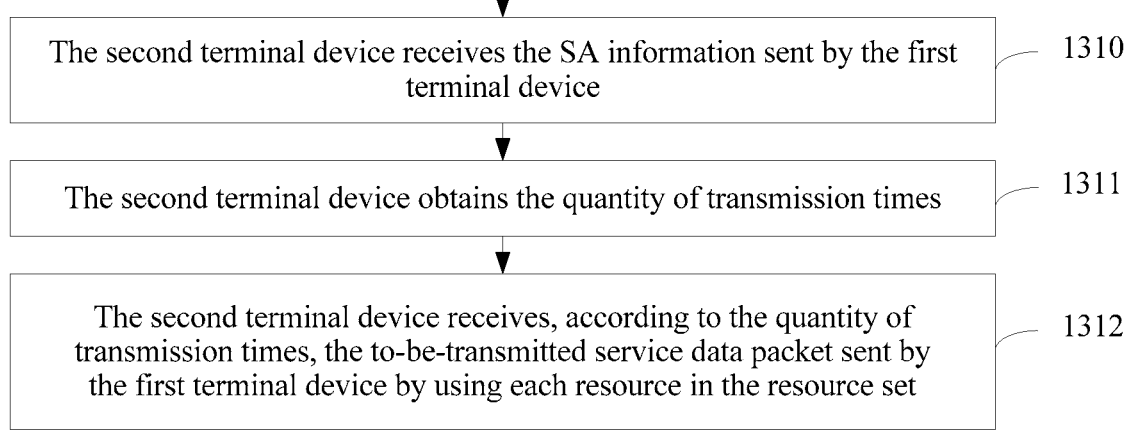

Another embodiment of the present application provides a resource allocation method. As shown in FIG. 18A and FIG. 18B, in a scenario in which a quantity of transmission times may be configured at a cell level, the method may include the following steps.

The scenario may be applied to a communications system assisted by a network device, and in the scenario, the network device configures a same quantity of transmission times for all terminal devices in a same cell.

1301. A first terminal device sends a transmission resource request to a network device.

When the first terminal device needs to send a to-be-transmitted service data packet to a nearby second terminal device, the first terminal device may first send the transmission resource request to the network device to request transmission resources from the network device. In addition, the first terminal device may report status information of the first terminal device such as a buffer status to the network device, so as to assist the network device in allocating transmission resources to the first terminal device according to the status information.

1302. The network device receives the transmission resource request sent by the first terminal device.

1303. The network device determines a quantity of transmission times according to a load status of a current cell and in response to the transmission resource request, and allocates a resource set to the first terminal device according to the quantity of transmission times.

A quantity of resources included in the resource set is equal to the quantity of transmission times, and the resources are a set of one or more physical resource blocks used by the first terminal device to send the to-be-transmitted service data packet.

Specifically, to avoid occurrence of a problem that when multiple terminal devices need to transmit service data packets simultaneously, overall system performance is degraded because all the terminal devices need to use fixed four-time transmission to transmit the to-be-transmitted service data packets but available transmission resources are limited, after the network device receives the transmission resource request and the status information that are sent by the first terminal device, the network device may first determine the quantity of transmission times according to the load status of the current cell and in response to the transmission resource request, and then allocate, to the first terminal device according to the determined quantity of transmission times and the status information, the quantity of resources that is equal to the quantity of transmission times.

For example, in this embodiment of the present application, that the network device determines a quantity of transmission times according to a load status of a current cell may be specifically: the network device determines the quantity of transmission times according to a quantity of available resources in a next scheduling period, a quantity of resources required in the next scheduling period, and a preset threshold. The quantity of available resources in the next scheduling period, the quantity of resources required in the next scheduling period, and the preset threshold meet the following conditions: a ratio of the quantity of resources required in the next scheduling period to the quantity of available resources in the next scheduling period is less than the preset threshold; and the quantity of transmission times is obtained according to the quantity of resources required in the next scheduling period and a quantity of terminal devices that need to be scheduled in the next scheduling period.

For example, the quantity of available resources in the next scheduling period is M, the quantity of resources required in the next scheduling period is N, and the preset threshold is T. The quantity N of resources required in the next scheduling period is equal to a product of the quantity X of terminal devices that need to be scheduled in the next scheduling period and the quantity K of transmission times, that is, the quantity of available resources in the next scheduling period, the quantity of resources required in the next scheduling period, and the preset threshold meet the following formula:

$X \times K \div M < T.$

In this case, the network device may substitute a value, starting from a maximum possible value of K, into the formula until the network device obtains a K value that meets the formula, namely, the determined quantity of transmission times. The maximum possible value of K may be specified by a protocol, or may be predefined, and is not specifically limited herein in this embodiment of the present application.

1304. The network device sends time-frequency resource location information of each resource in the resource set to the first terminal device.

1305. The first terminal device receives the time-frequency resource location information of each resource in the resource set sent by the network device.

1306. The network device broadcasts the quantity of transmission times in the current cell.

To enable another terminal device in the cell to learn the quantity of transmission times in the next scheduling period, the network device may broadcast, in the current cell, the quantity of transmission times by using a system broadcast message, RRC signaling, or a common control channel.

Further optionally, before the network device broadcasts the quantity of transmission times in the current cell, the network device may first determine whether the quantity of transmission times in the next scheduling period is the same as a quantity of transmission times in a previous scheduling period, and when the quantity of transmission times in the next scheduling period is different from the quantity of transmission times in the previous scheduling period, perform an operation of broadcasting the quantity of transmission times in the current cell.

1307. The first terminal device receives the quantity of transmission times sent by the network device.

1308. The first terminal device sends SA information to a second terminal device.

When D2D communication is used for communication between terminal devices, the first terminal device first needs to send the SA information before sending the to-be-transmitted service data packet. Certainly, resources required for sending the SA information may be allocated to the first terminal device after the network device receives the transmission resource request sent by the first terminal device. Because the second terminal device may be a terminal device located in the same cell as the first terminal device, or may be a terminal device not located in the same cell as the first terminal device, when the second terminal device is a terminal device not located in the same cell as the first terminal device, to enable the second terminal device to learn the quantity of transmission times used by the first terminal device to send the to-be-transmitted service data packet, the SA information sent by the first terminal device to the second terminal device carries the quantity of transmission times in addition to information such as a time-frequency resource location of the to-be-transmitted service data packet to be sent by the first terminal device, an MCS, a frequency hopping indication, a timing advance, and a receiving group ID.

The quantity of transmission times may be indicated in multiple manners. Several solutions provided by this embodiment of the present application may specifically include the following four manners:

Manner 1: Indication information added in the SA information is used to indicate the quantity of transmission times.

For example, indication information may be added to the SA information and used to indicate the quantity of transmission times. For example, Y (for example, Y=2) bits are added to the SA information to indicate the quantity of transmission times. In this case, information included in the SA information and a quantity of bits corresponding to each piece of information may be shown in Table 1.

TABLE 1

| Information included in the SA information | Quantity of bits |
|---|---|
| Indication information | 2 |
| MCS | 5 |
| Frequency hopping indication (English: Hopping flag) | 1 |
| Resource configuration (RA) | 13 |
| Time resource pattern for transmission (English: time resource pattern for transmission, T-RPT for short) | 7 |
| ID | 8 |
| Timing advance (English timing advance, TA for short) | 6 |

For example, indication information 00 is used to indicate that the quantity of transmission times is 1, indication information 01 is used to indicate that the quantity of transmission times is 2, indication information 10 is used to indicate that the quantity of transmission times is 3, and indication information 11 is used to indicate that the quantity of transmission times is 4. A correspondence between the indication information and the quantity of transmission times may be preconfigured in the network device and the terminal device, or may be notified by the network device to the terminal device in advance. This is not specifically limited herein in this embodiment of the present application.

Manner 2: A DMRS of the SA information is used to indicate the quantity of transmission times. In this case, before step 1308 in which the first terminal device sends the SA information to the second terminal device, the method may further include: setting one or a combination of a cell ID, a CS, or an OCC of the SA information corresponding to the quantity of transmission times, and generating the DMRS of the SA information.

Parameters affecting the DMRS of the SA information are shown in Table 2, and include the cell ID, the CS, and the OCC. In the existing standard protocol, the cell ID of a DMRS base sequence (English: DMRS base sequence) is set to fixed 510, the CS is set to 0, and the OCC is set to [1 1]. In this embodiment of the present application, to distinguish different quantities of transmission times, the cell ID, the CS, and the OCC may be set to different values. In this way, generated DMRSs are also different, so that the second terminal device can learn, by using detecting the DMRS of the SA information, the quantity of transmission times used by the first terminal device to send the to-be-transmitted service data packet.

TABLE 2

| | Scrambling (English: Scrambling) | | | | DMRS base sequence | | | | | |
|---|---|---|---|---|---|---|---|---|---|---|
| | Cell ID | RNTI | Quantity of time-slots | Code-word index | Group hopping (English: Group hopping) | Sequence hopping (English: Sequence hopping) | Delta shift | Cell ID | CS | DMRS OCC |
| SA information | 510 | Fixed to 0 | Fixed to 0 | Fixed to 0 | Disabled | Disabled | 0 | 510 | 0 | Fixed to [1 1] |

For example, different quantities of transmission times are distinguished by setting the cell ID. For example, the quantity of transmission times is 4, and the corresponding cell ID is set to 510; the quantity of transmission times is 2, and the corresponding cell ID is set to 511. A correspondence between the cell ID and the quantity of transmission times may be preconfigured in the network device and the terminal device, or may be notified by the network device to the terminal device by using a system information block (English: system information block, SIB for short) message, RRC signaling, or the like. The correspondence may also be predefined in the protocol.

When different quantities of transmission times are distinguished by setting the CS, because a maximum quantity of CSs supported by an LTE system is 8, a quantity A of CSs may be selected and used to indicate corresponding quantities of transmission times. A correspondence between the CS and the quantity of transmission times may be preconfigured in the network device and the terminal device, or may be notified by the network device to the terminal device by using a SIB message, RRC signaling, or the like. The correspondence may also be predefined in the protocol.

When different quantities of transmission times are distinguished by setting the OCC, because a quantity of OCCs supported by the LTE system is 2, which are [1 1] and [1 −1] respectively, different OCCs may be used to indicate different quantities of transmission times. For example, the quantity of transmission times is 4, and the corresponding OCC is set to [1 1]; the quantity of transmission times is 2, and the corresponding OCC is set to [1 −1]. A correspondence between the OCC and the quantity of transmission times may be preconfigured in the network device and the terminal device, or may be notified by the network device to the terminal device by using a SIB message, RRC signaling, or the like. The correspondence may also be predefined in the protocol.

Certainly, different quantities of transmission times may also be distinguished by using a combination of the cell ID, the CS, and the OCC.

Manner 3: A scrambling sequence of the SA information is used to indicate the quantity of transmission times. In this case, before step 1308 in which the first terminal device sends the SA information to the second terminal device, the method may further include: setting a cell ID and/or an RNTI of the SA information corresponding to the quantity of transmission times, generating the scrambling sequence of the SA information, and scrambling the SA information according to the scrambling sequence.

Parameters affecting the scrambling sequence of the SA information are shown in Table 2, and include the cell ID, the RNTI, the quantity of timeslots (English: Slot number), and the codeword index (CW index). The scrambling sequence of the SA information sent by the terminal device is determined according to the cell ID and the RNTI, and in the existing standard protocol, the cell ID is set to fixed 510, and the RNTI is set to 0. Therefore, scrambling sequences of SA information of all terminal devices are the same. In this embodiment of the present application, to distinguish different quantities of transmission times, the cell ID and/or the RNTI may be set to different values. In this way, generated scrambling sequences are also different. The SA information is scrambled by using a scrambling sequence with parameters adjusted, and then is sent to the second terminal device.

For example, different quantities of transmission times are distinguished by setting the cell ID and the RNTI. For example, the quantity of transmission times is 4, the corresponding cell ID is set to 511, and the RNTI is set to 0; the quantity of transmission times is 3, the corresponding cell ID is set to 511, and the RNTI is set to 1; the quantity of transmission times is 2, the corresponding cell ID is set to 510, and the RNTI is set to 0; the quantity of transmission times is 1, the corresponding cell ID is set to 510, and the RNTI is set to 1.

It should be noted that, in this embodiment of the present application, only a possible implementation of distinguishing different quantities of transmission times by using different parameter values of the cell ID and the RNTI is provided. Because both the cell ID and the RNTI may be set to different values within a value range, and different parameter values of the cell ID and the RNTI may be further combined, parameter values in the foregoing embodiment are only a possible implementation. In a specific implementation, any other usable values of the cell ID and the RNTI may be used to indicate different quantities of transmission times.

Manner 4: A mask is used to indicate the quantity of transmission times. In this case, before step 1308 in which the first terminal device sends the SA information to the second terminal device, the method may further include: multiplying a CRC of the SA information by the mask corresponding to the quantity of transmission times.

For example, the existing SA information uses a 24-bit CRC. In this embodiment of the present application, a mask may be added to distinguish different quantities of transmission times. For example, without changing a CRC length, the CRC is multiplied by the mask corresponding to the quantity of transmission times to distinguish different quantities of transmission times.

Within an appropriate value range, a value of the mask may be selected randomly. For describing this embodiment, the following provides several possible implementations, for example:

the quantity of transmission times is 4, and the corresponding mask sequence is set to <000000000000000000000000>;

the quantity of transmission times is 3, and the corresponding mask sequence is set to <010101010101010101010101>;

the quantity of transmission times is 2, and the corresponding mask sequence is set to <101010101010101010101010>; and the quantity of transmission times is 1, and the corresponding mask sequence is set to <111111111111111111111111>.

It should be noted that, in this embodiment of the present application, only a possible implementation of distinguishing different quantities of transmission times by using different values of the mask sequence is provided. Because the mask sequence may be set to different values within an appropriate value range, the values in the foregoing embodiment are only a possible implementation. In a specific implementation, any other usable values of the mask sequence may be used to indicate different quantities of transmission times.

1309. The first terminal device sends, according to the time-frequency resource location information of each resource in the resource set, a to-be-transmitted service data packet to the second terminal device by using each resource in the resource set.

1310. The second terminal device receives the SA information sent by the first terminal device.

The SA information carries the quantity of transmission times.

1311. The second terminal device obtains the quantity of transmission times.

In an application scenario, when the second terminal device is a terminal device located in the same cell as the first terminal device, the second terminal device may obtain the quantity of transmission times according to the received system broadcast message, RRC signaling, or common control channel that is sent by the network device.

In another application scenario, when the second terminal device is a terminal device not located in the same cell as the first terminal device, the second terminal device may obtain the quantity of transmission times according to the received SA information. Certainly, when the second terminal device is a terminal device located in the same cell as the first terminal device, the second terminal device may also obtain the quantity of transmission times according to the received SA information.

Because the first terminal device may indicate the quantity of transmission times in multiple different manners, correspondingly, specific manners of obtaining the quantity of transmission times by the second terminal device are also different. Specifically, the following four manners may be included:

When the first terminal device uses the manner 1 in step 1308, that is, the indication information added in the SA information is used to indicate the quantity of transmission times, that the second terminal device obtains the quantity of transmission times may specifically include: the second terminal device determines the quantity of transmission times according to the indication information.

The second terminal device may determine the quantity of transmission times according to the indication information in the received SA information.

When the first terminal device uses the manner 2 in step 1308, that is, the DMRS of the SA information is used to indicate the quantity of transmission times, that the second terminal device obtains the quantity of transmission times may specifically include: the second terminal device obtains the DMRS of the SA information, and determines the quantity of transmission times based on one or a combination of the cell ID, the CS, or the OCC in the DMRS.

When the first terminal device uses the manner 3 in step 1308, that is, the scrambling sequence of the SA information is used to indicate the quantity of transmission times, that the second terminal device obtains the quantity of transmission times may specifically include: the second terminal device descrambles the SA information, obtains the scrambling sequence of the SA information, and determines the quantity of transmission times according to the cell ID and/or the RNTI in the scrambling sequence.

The second terminal device may generate different local scrambling sequences according to different parameters corresponding to different quantities of transmission times. When a local scrambling sequence matches the scrambling sequence of the sent SA information, the received SA information may be obtained by decoding. Therefore, the second terminal device may determine, by detecting the scrambling sequence of the SA information, the quantity of transmission times used by the first terminal device to send the to-be-transmitted service data packet.

When the first terminal device uses the manner 4 in step 1308, that is, the mask is used to indicate the quantity of transmission times, that the second terminal device obtains the quantity of transmission times may specifically include: the second terminal device obtains the CRC of the SA information, and determines the quantity of transmission times according to the mask corresponding to the CRC.

After the second terminal device decodes the received SA information to generate the CRC, the second terminal device may multiply the CRC generated by decoding, by the mask sequences corresponding to preset different quantities of transmission times, compare multiplication results with the CRC carried in the received SA information, and when a result obtained after the CRC generated by decoding is multiplied by a mask sequence matches the CRC carried in the received SA information, determine the quantity of transmission times corresponding to the mask sequence as the quantity of transmission times used by the first terminal device to send the to-be-transmitted service data packet.

1312. The second terminal device receives, according to the quantity of transmission times, the to-be-transmitted service data packet sent by the first terminal device by using each resource in the resource set.

After obtaining the quantity of transmission times, the second terminal device may receive, according to the quantity of transmission times, the to-be-transmitted service data packet sent by the first terminal device by using each resource in the resource set.

According to the resource allocation method provided by this embodiment of the present application, a network device first determines a quantity of transmission times in response to a received transmission resource request sent by a first terminal device, then allocates, to the first terminal device according to the determined quantity of transmission times, a resource set including a quantity of resources that is equal to the quantity of transmission times, and sends time-frequency resource location information of each resource in the resource set to the first terminal device, so that the first terminal device sends a to-be-transmitted service data packet according to the time-frequency resource location information of each resource in the resource set. In this way, the network device flexibly configures the quantity of transmission times, a probability that transmission resources in which time resources are the same and frequency resources are the same or in which time resources are the same and frequency resources are adjacent are allocated to different terminal devices is reduced, and therefore, overall system performance is improved.

Figure 19A:
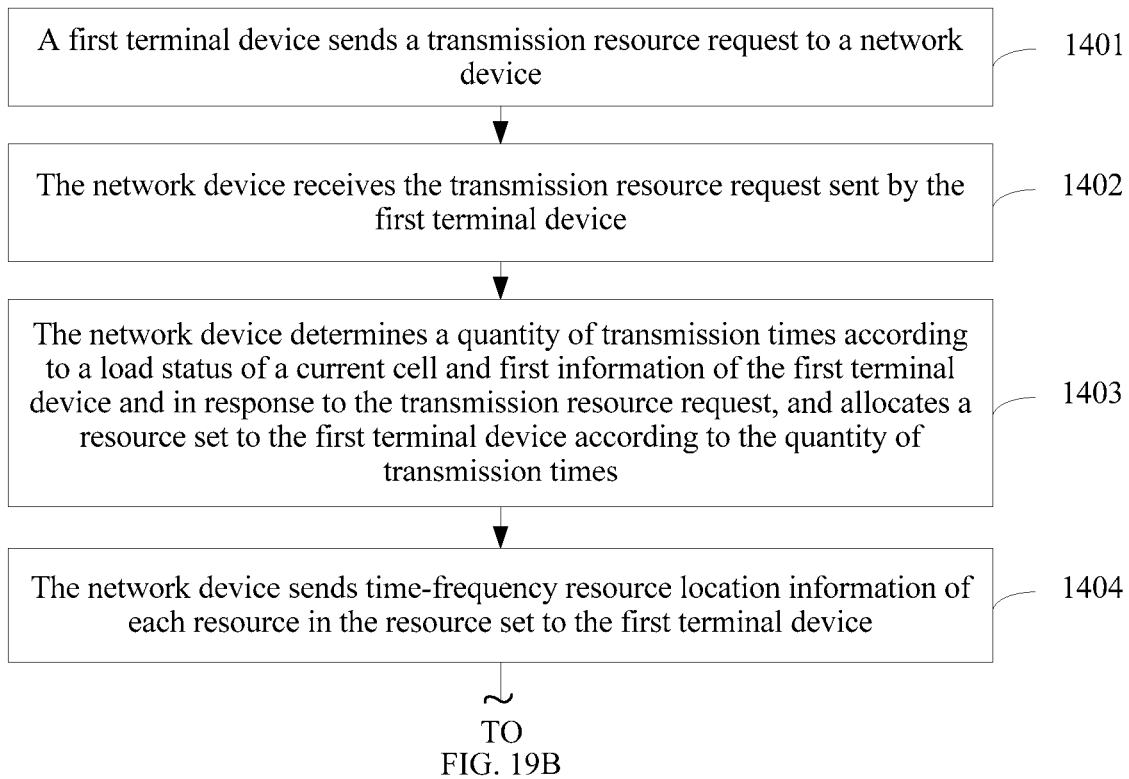

Another embodiment of the present application provides a resource allocation method. As shown in FIG. 19A and FIG. 19B, in a scenario in which a quantity of transmission times may be configured at a user level, the method may include the following steps.

The scenario may be applied to a communications system assisted by a network device, and in the scenario, quantities of transmission times configured by the network device for different terminal devices in a same cell are different.

1401. A first terminal device sends a transmission resource request to a network device.

1402. The network device receives the transmission resource request sent by the first terminal device.

1403. The network device determines a quantity of transmission times according to a load status of a current cell and first information of the first terminal device and in response to the transmission resource request, and allocates a resource set to the first terminal device according to the quantity of transmission times.

A quantity of resources included in the resource set is equal to the quantity of transmission times, and the resources are a set of one or more physical resource blocks used by the first terminal device to send a to-be-transmitted service data packet. The first information of the first terminal device may include at least one of the following: a level of the first terminal device, a service type of the first terminal device, or a QoS requirement of the first terminal device.

1404. The network device sends time-frequency resource location information of each resource in the resource set to the first terminal device.

1405. The first terminal device receives the time-frequency resource location information of each resource in the resource set sent by the network device.

1406. The network device sends the quantity of transmission times to the first terminal device.

The network device may send the quantity of transmission times to the first terminal device by using dedicated RRC signaling or a dedicated control channel.

1407. The first terminal device receives the quantity of transmission times sent by the network device.

1408. The first terminal device sends SA information to a second terminal device.

When D2D communication is used for communication between terminal devices, the first terminal device first needs to send the SA information before sending the to-be-transmitted service data packet. Certainly, resources required for sending the SA information may be allocated to the first terminal device after the network device receives the transmission resource request sent by the first terminal device. To enable the second terminal device to learn the quantity of transmission times used by the first terminal device to send the to-be-transmitted service data packet, the SA information sent by the first terminal device to the second terminal device carries the quantity of transmission times in addition to information such as a time-frequency resource location of the to-be-transmitted service data packet to be sent by the first terminal device, an MCS, a frequency hopping indication, a timing advance, and a receiving group ID.

The quantity of transmission times may be indicated in multiple manners. Several solutions provided by this embodiment of the present application may specifically include the following four manners:

Manner 1: Indication information added in the SA information is used to indicate the quantity of transmission times.

Manner 2: A DMRS of the SA information is used to indicate the quantity of transmission times. In this case, before step 1408 in which the first terminal device sends the SA information to the second terminal device, the method may further include: setting one or a combination of a cell ID, a CS, or an OCC of the SA information corresponding to the quantity of transmission times, and generating the DMRS of the SA information.

Manner 3: A scrambling sequence of the SA information is used to indicate the quantity of transmission times. In this case, before step 1408 in which the first terminal device sends the SA information to the second terminal device, the method may further include: setting a cell ID and/or an RNTI of the SA information corresponding to the quantity of transmission times, generating the scrambling sequence of the SA information, and scrambling the SA information according to the scrambling sequence.

Manner 4: A mask is used to indicate the quantity of transmission times. In this case, before step 1408 in which the first terminal device sends the SA information to the second terminal device, the method may further include: multiplying a CRC of the SA information by the mask corresponding to the quantity of transmission times.

1409. The first terminal device sends, according to the time-frequency resource location information of each resource in the resource set, a to-be-transmitted service data packet to the second terminal device by using each resource in the resource set.

1410. The second terminal device receives the SA information sent by the first terminal device.

The SA information carries the quantity of transmission times.

1411. The second terminal device obtains the quantity of transmission times.

The second terminal device may obtain the quantity of transmission times according to the received SA information. Because the first terminal device may indicate the quantity of transmission times in multiple different manners, correspondingly, specific manners of obtaining the quantity of transmission times by the second terminal device are also different. Specifically, the following four manners may be included:

When the first terminal device uses the manner 1 in step 1408, that is, the indication information added in the SA information is used to indicate the quantity of transmission times, that the second terminal device obtains the quantity of transmission times may specifically include: the second terminal device determines the quantity of transmission times according to the indication information.

When the first terminal device uses the manner 2 in step 1408, that is, the DMRS of the SA information is used to indicate the quantity of transmission times, that the second terminal device obtains the quantity of transmission times may specifically include: the second terminal device obtains the DMRS of the SA information, and determines the quantity of transmission times based on one or a combination of the cell ID, the CS, or the OCC in the DMRS.

When the first terminal device uses the manner 3 in step 1408, that is, the scrambling sequence of the SA information is used to indicate the quantity of transmission times, that the second terminal device obtains the quantity of transmission times may specifically include: the second terminal device descrambles the SA information, obtains the scrambling sequence of the SA information, and determines the quantity of transmission times according to the cell ID and/or the RNTI in the scrambling sequence.

When the first terminal device uses the manner 4 in step 1408, that is, the mask is used to indicate the quantity of transmission times, that the second terminal device obtains the quantity of transmission times may specifically include: the second terminal device obtains the CRC of the SA information, and determines the quantity of transmission times according to the mask corresponding to the CRC.

1412. The second terminal device receives, according to the quantity of transmission times, the to-be-transmitted service data packet sent by the first terminal device by using each resource in the resource set.

It should be noted that, for detailed descriptions of step 1401 to step 1412 in this embodiment of the present application, reference may be made to detailed descriptions of corresponding steps in other method embodiments of the present application. Details are not exhaustively described again herein in this embodiment of the present application.

According to the resource allocation method provided by this embodiment of the present application, a network device first determines a quantity of transmission times in response to a received transmission resource request sent by a first terminal device, then allocates, to the first terminal device according to the determined quantity of transmission times, a resource set including a quantity of resources that is equal to the quantity of transmission times, and sends time-frequency resource location information of each resource in the resource set to the first terminal device, so that the first terminal device sends a to-be-transmitted service data packet according to the time-frequency resource location information of each resource in the resource set. In this way, the network device flexibly configures the quantity of transmission times, a probability that transmission resources in which time resources are the same and frequency resources are the same or in which time resources are the same and frequency resources are adjacent are allocated to different terminal devices is reduced, and therefore, overall system performance is improved.

In addition, different QoS is achieved for terminal devices at different levels or with different service types or different QoS requirements by configuring different quantities of transmission times for the terminal devices according to information of the terminal devices.

Figure 20A:
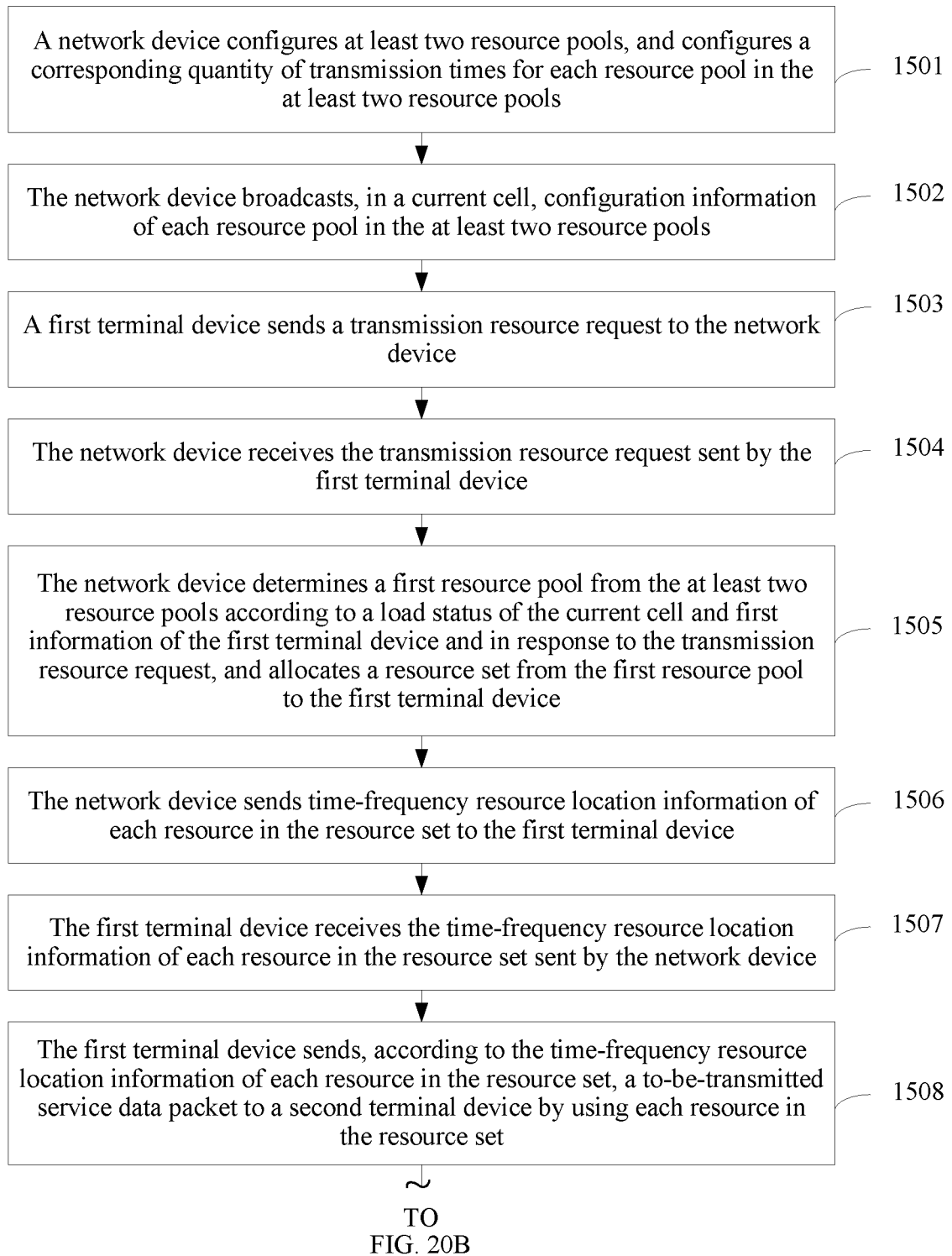

Another embodiment of the present application provides a resource allocation method. As shown in FIG. 20A and FIG. 20B, in a scenario in which a network device configures at least two resource pools, where quantities of transmission times configured for the resource pools are different, so as to implement flexible configuration of the quantities of transmission times, the method may include the following steps. The scenario may be applied to a communications system assisted by a network device.

1501. A network device configures at least two resource pools, and configures a corresponding quantity of transmission times for each resource pool in the at least two resource pools.

Quantities of transmission times configured for different resource pools are different. Specifically, in this embodiment of the present application, multiple resource pools are configured, and different quantities of transmission times are configured for the resource pools, so that flexible configuration of the quantities of transmission times is implemented. The resource pools may be mutually independent without overlapping, or may partly or completely overlap each other.

For example, the network device configures a total of four resource pools, which are a resource pool 1, a resource pool 2, a resource pool 3, and a resource pool 4 respectively, where a quantity of transmission times configured for the resource pool 1 is 1, a quantity of transmission times configured for the resource pool 2 is 2, a quantity of transmission times configured for the resource pool 3 is 3, and a quantity of transmission times configured for the resource pool 4 is 4.

1502. The network device broadcasts, in a current cell, configuration information of each resource pool in the at least two resource pools.

The configuration information of the resource pool includes a quantity of transmission times configured for the resource pool. After the network device configures the at least two resource pools and configures different quantities of transmission times for the resource pools, the network device may broadcast, in the current cell, the configuration information of each resource pool in the at least two resource pools.

1503. A first terminal device sends a transmission resource request to the network device.

1504. The network device receives the transmission resource request sent by the first terminal device.

1505. The network device determines a first resource pool from the at least two resource pools according to a load status of the current cell and first information of the first terminal device and in response to the transmission resource request, and allocates a resource set from the first resource pool to the first terminal device.

The first information of the first terminal device may include at least one of the following: a level of the first terminal device, a service type of the first terminal device, or a QoS requirement of the first terminal device. A quantity of resources included in the resource set is equal to a quantity of transmission times configured for the first resource pool, and the resources are a set of one or more physical resource blocks used by the first terminal device to send a to-be-transmitted service data packet.

Specifically, after the network device receives the transmission resource request sent by the first terminal device, the network device may determine the quantity of transmission times according to the load status of the current cell and the first information of the first terminal device, determine, from the at least two configured resource pools, a resource pool with a quantity of transmission times equal to the determined quantity of transmission times as the first resource pool, and allocate the resource set from the first resource pool to the first terminal device, where the quantity of resources in the resource set is equal to the quantity of transmission times.

1506. The network device sends time-frequency resource location information of each resource in the resource set to the first terminal device.

1507. The first terminal device receives the time-frequency resource location information of each resource in the resource set sent by the network device.

Certainly, when D2D communication is used for communication between terminal devices, the first terminal device first needs to send SA information before sending the to-be-transmitted service data packet. Resources required for sending the SA information may also be allocated to the first terminal device after the network device receives the transmission resource request sent by the first terminal device.

1508. The first terminal device sends, according to the time-frequency resource location information of each resource in the resource set, a to-be-transmitted service data packet to a second terminal device by using each resource in the resource set.

The first terminal device first sends the SA information to the second terminal device according to the transmission resources allocated by the network device and used for transmitting the SA information, and then sends, according to the time-frequency resource location information of each resource in the resource set, the to-be-transmitted service data packet to the second terminal device by using each resource in the resource set.

1509. The second terminal device receives configuration information of the first resource pool sent by the network device.

1510. The second terminal device determines, according to the configuration information of the currently monitored first resource pool, that a quantity of transmission times configured for the first resource pool is the quantity of transmission times for the second terminal device.

The configuration information of the first resource pool includes the quantity of transmission times configured for the first resource pool. When the second terminal device receives the SA information in the first resource pool, the second terminal device may determine, according to the configuration information of the first resource pool, that the quantity of transmission times configured for the first resource pool is the quantity of transmission times used by the first terminal device to send the to-be-transmitted service data packet.

1511. The second terminal device receives, according to the quantity of transmission times, the to-be-transmitted service data packet sent by the first terminal device by using each resource in the resource set.

It should be noted that, for detailed descriptions of step 1501 to step 1511 in this embodiment of the present application, reference may be made to detailed descriptions of corresponding steps in other method embodiments of the present application. Details are not exhaustively described again herein in this embodiment of the present application.

According to the resource allocation method provided by this embodiment of the present application, a network device first configures at least two resource pools, and configures a corresponding quantity of transmission times for each resource pool in the at least two resource pools, then after receiving a transmission resource request sent by a first terminal device, determines a first resource pool from the at least two resource pools according to a load status of a current cell and first information of the first terminal device and in response to the transmission resource request, allocates a resource set from the first resource pool to the first terminal device, and finally sends time-frequency resource location information of each resource in the resource set to the first terminal device, so that the first terminal device sends a to-be-transmitted service data packet according to the time-frequency resource location information of each resource in the resource set. In this way, by configuring multiple resource pools with different quantities of transmission times, the network device implements flexible configuration of the quantities of transmission times, a probability that transmission resources in which time resources are the same and frequency resources are the same or in which time resources are the same and frequency resources are adjacent are allocated to different terminal devices is reduced, and therefore, overall system performance is improved.

Figure 21:
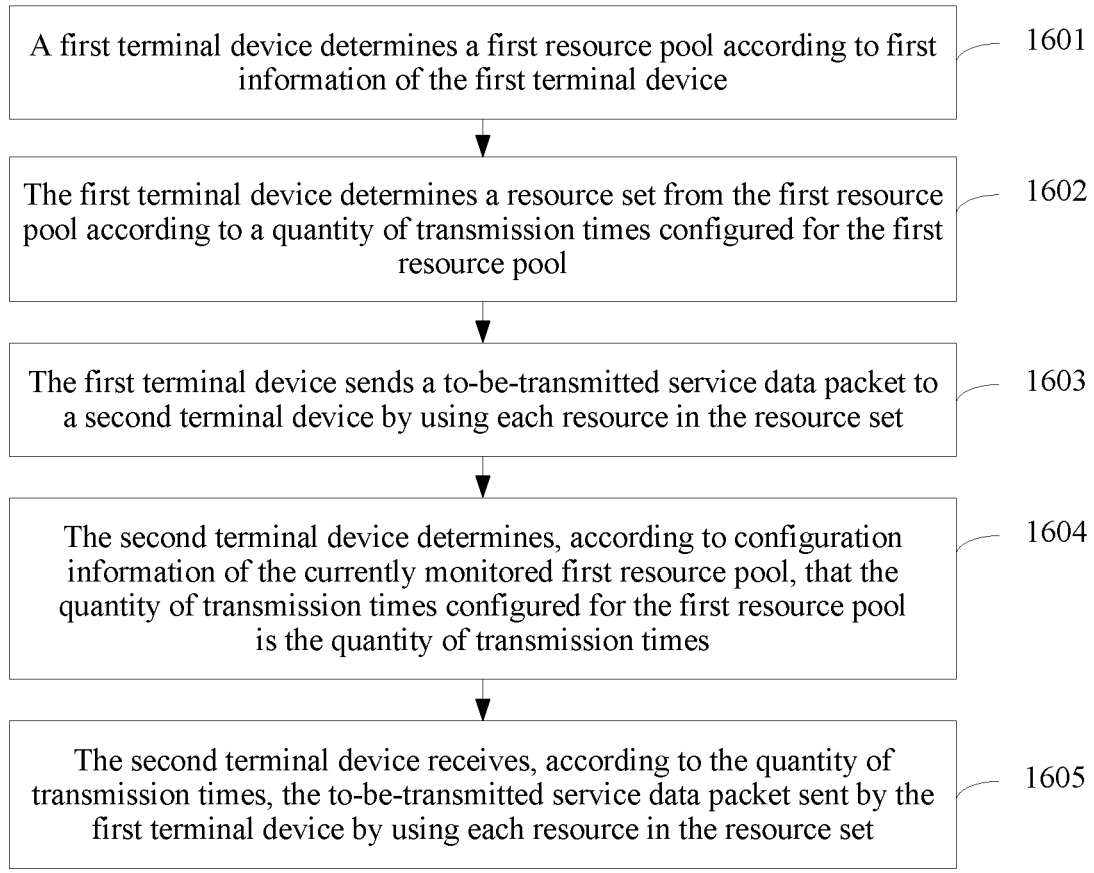
FIG. 21 is a flowchart of a resource allocation method according to another embodiment of the present application.

Another embodiment of the present application provides a resource allocation method. As shown in FIG. 21, in a scenario in which at least two resource pools are preconfigured, where quantities of transmission times configured for the resource pools are different, so as to implement flexible configuration of the quantities of transmission times, the method may include the following steps. The scenario may be applied to a communications system not assisted by a network device.

1601. A first terminal device determines a first resource pool according to first information of the first terminal device.

The first resource pool is one of at least two preconfigured resource pools, and different quantities of transmission times are configured for resource pools in the at least two resource pools. The first information of the first terminal device may include at least one of the following: a level of the first terminal device, a service type of the first terminal device, or a QoS requirement of the first terminal device. The at least two resource pools may be preconfigured according to a protocol specification, or may be preconfigured in a predefined manner.

Specifically, when the first terminal device needs to send a to-be-transmitted service data packet to a nearby second terminal device, the first terminal device may first determine, according to the first information of the first terminal device, a quantity of transmission times used for transmitting the to-be-transmitted service data packet, and determine the first resource pool from the at least two preconfigured resource pools according to the quantity of transmission times, where a quantity of transmission times configured for the first resource pool is equal to the determined quantity of transmission times.

1602. The first terminal device determines a resource set from the first resource pool according to a quantity of transmission times configured for the first resource pool.

A quantity of resources included in the resource set is equal to the quantity of transmission times configured for the first resource pool, and the resources are a set of one or more physical resource blocks used by the first terminal device to send the to-be-transmitted service data packet.

Specifically, after the first terminal device determines the first resource pool, the first terminal device may randomly select, from the first resource pool according to the quantity of transmission times configured for the first resource pool, a quantity of resources that is equal to the quantity of transmission times configured for the first resource pool as a resource set.

Certainly, when D2D communication is used for communication between terminal devices, before sending the to-be-transmitted service data packet, the first terminal device first needs to send SA information. Resources required for sending the SA information may be randomly selected by the first terminal device from the resource pool.

1603. The first terminal device sends a to-be-transmitted service data packet to a second terminal device by using each resource in the resource set.

The first terminal device first sends the SA information to the second terminal device by using the transmission resources used for transmitting the SA information, and then sends, according to time-frequency resource location information of each resource in the resource set, the to-be-transmitted service data packet to the second terminal device by using each resource in the resource set.

1604. The second terminal device determines, according to configuration information of the currently monitored first resource pool, that the quantity of transmission times configured for the first resource pool is the quantity of transmission times.

The configuration information of the first resource pool includes the quantity of transmission times configured for the first resource pool.

Specifically, when the second terminal device receives the SA information in the first resource pool, the second terminal device may determine, according to the configuration information of the first resource pool, that the quantity of transmission times configured for the first resource pool is the quantity of transmission times used by the first terminal device to send the to-be-transmitted service data packet.

1605. The second terminal device receives, according to the quantity of transmission times, the to-be-transmitted service data packet sent by the first terminal device by using each resource in the resource set.

It should be noted that, for detailed descriptions of step 1601 to step 1605 in this embodiment of the present application, reference may be made to detailed descriptions of corresponding steps in other method embodiments of the present application. Details are not exhaustively described again herein in this embodiment of the present application.

According to the resource allocation method provided by this embodiment of the present application, a first terminal device can first determine a first resource pool from at least two preconfigured resource pools according to first information of the first terminal device, then determine, according to a quantity of transmission times configured for the first resource pool, a resource set including a quantity of resources that is equal to the quantity of transmission times, and further send a to-be-transmitted service data packet to a second terminal device by using each resource in the resource set. In this way, by preconfiguring multiple resource pools with different quantities of transmission times, flexible configuration of the quantities of transmission times is implemented, a probability that different terminal devices select transmission resources in which time resources are the same and frequency resources are the same or in which time resources are the same and frequency resources are adjacent is reduced, and therefore, overall system performance is improved.

Figure 22:
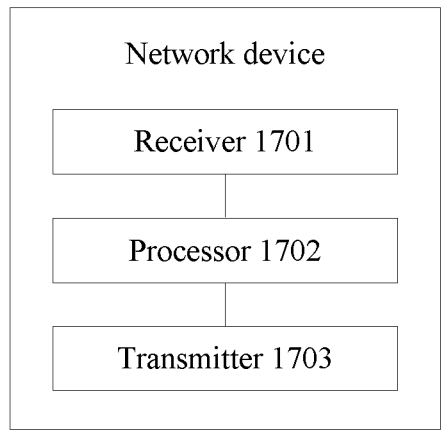
FIG. 22 is a schematic structural diagram of a network device according to another embodiment of the present application.

Another embodiment of the present application provides a network device. As shown in FIG. 22, the network device includes a receiver 1701, a processor 1702, and a transmitter 1703.

The receiver 1701 is configured to receive a transmission resource request sent by a first terminal device.

The processor 1702 is configured to determine a quantity of transmission times in response to the transmission resource request received by the receiver 1701, and allocate a resource set to the first terminal device according to the quantity of transmission times, where a quantity of resources included in the resource set is equal to the quantity of transmission times, and the resources are a set of one or more physical resource blocks used by the first terminal device to send a to-be-transmitted service data packet.

The transmitter 1703 is configured to send, to the first terminal device, time-frequency resource location information of each resource in the resource set allocated by the processor 1702.

In this embodiment of the present application, further, the processor 1702 is specifically configured to determine the quantity of transmission times according to a load status of a current cell.

In this embodiment of the present application, further, the processor 1702 is specifically configured to determine the quantity of transmission times according to a quantity of available resources in a next scheduling period, a quantity of resources required in the next scheduling period, and a preset threshold.

In this embodiment of the present application, further, the quantity of available resources in the next scheduling period, the quantity of resources required in the next scheduling period, and the preset threshold that are used when the processor 1702 determines the quantity of transmission times meet the following conditions:

a ratio of the quantity of resources required in the next scheduling period to the quantity of available resources in the next scheduling period is less than the preset threshold; and the quantity of transmission times is obtained according to the quantity of resources required in the next scheduling period and a quantity of terminal devices that need to be scheduled in the next scheduling period.

In this embodiment of the present application, further, the processor 1702 is specifically configured to determine the quantity of transmission times according to a load status of a current cell and first information of the first terminal device, where the first information of the first terminal device includes at least one of the following: a level of the first terminal device, a service type of the first terminal device, or a quality of service QoS requirement of the first terminal device.

In this embodiment of the present application, further, the transmitter 1703 is further configured to broadcast the quantity of transmission times in the current cell, or send the quantity of transmission times to the first terminal device.

In this embodiment of the present application, further, the transmitter 1703 is specifically configured to broadcast, in the current cell, the quantity of transmission times by using a system broadcast message, radio resource control RRC signaling, or a common control channel.

In this embodiment of the present application, further, the transmitter 1703 is specifically configured to send the quantity of transmission times to the first terminal device by using dedicated RRC signaling or a dedicated control channel.

It should be noted that, for a specific working process of each functional module in the network device provided by this embodiment of the present application, reference may be made to a detailed description of a corresponding process in a method embodiment. Details are not described again herein in this embodiment of the present application.

The network device provided by this embodiment of the present application first determines a quantity of transmission times in response to a received transmission resource request sent by a first terminal device, then allocates, to the first terminal device according to the determined quantity of transmission times, a resource set including a quantity of resources that is equal to the quantity of transmission times, and sends time-frequency resource location information of each resource in the resource set to the first terminal device, so that the first terminal device sends a to-be-transmitted service data packet according to the time-frequency resource location information of each resource in the resource set. In this way, the network device flexibly configures the quantity of transmission times, a probability that transmission resources in which time resources are the same and frequency resources are the same or in which time resources are the same and frequency resources are adjacent are allocated to different terminal devices is reduced, and therefore, overall system performance is improved.

Figure 23:
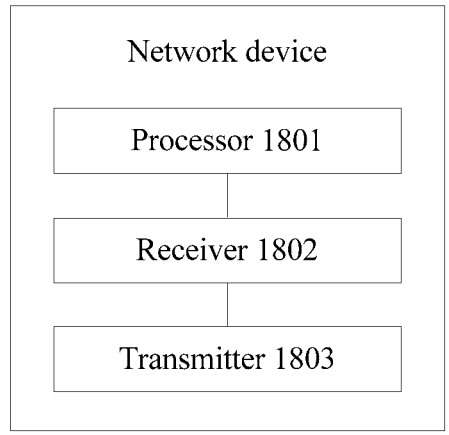
FIG. 23 is a schematic structural diagram of a network device according to another embodiment of the present application.

Another embodiment of the present application provides a network device. As shown in FIG. 23, the network device includes a processor 1801, a receiver 1802, and a transmitter 1803.

The processor 1801 is configured to configure at least two resource pools, and configure a corresponding quantity of transmission times for each resource pool in the at least two resource pools, where quantities of transmission times configured for different resource pools are different.

The receiver 1802 is configured to receive a transmission resource request sent by a first terminal device.

The processor 1801 is further configured to determine a first resource pool from the at least two resource pools according to a load status of a current cell and first information of the first terminal device and in response to the transmission resource request received by the receiver 1802, and allocate a resource set from the first resource pool to the first terminal device, where the first information of the first terminal device includes at least one of the following: a level of the first terminal device, a service type of the first terminal device, or a quality of service QoS requirement of the first terminal device, a quantity of resources included in the resource set is equal to a quantity of transmission times configured for the first resource pool, and the resources are a set of one or more physical resource blocks used by the first terminal device to send a to-be-transmitted service data packet.

The transmitter 1803 is configured to send, to the first terminal device, time-frequency resource location information of each resource in the resource set allocated by the processor 1801.

In this embodiment of the present application, further, the transmitter 1803 is further configured to broadcast, in the current cell, configuration information of each resource pool in the at least two resource pools after the processor 1801 configures the at least two resource pools and configures the corresponding quantity of transmission times for each resource pool in the at least two resource pools, where the configuration information of the resource pool includes a quantity of transmission times configured for the resource pool.

It should be noted that, for a specific working process of each functional module in the network device provided by this embodiment of the present application, reference may be made to a detailed description of a corresponding process in a method embodiment. Details are not described again herein in this embodiment of the present application.

The network device provided by this embodiment of the present application first configures at least two resource pools, and configures a corresponding quantity of transmission times for each resource pool in the at least two resource pools, then after receiving a transmission resource request sent by a first terminal device, determines a first resource pool from the at least two resource pools according to a load status of a current cell and first information of the first terminal device and in response to the transmission resource request, allocates a resource set from the first resource pool to the first terminal device, and finally sends time-frequency resource location information of each resource in the resource set to the first terminal device, so that the first terminal device sends a to-be-transmitted service data packet according to the time-frequency resource location information of each resource in the resource set. In this way, by configuring multiple resource pools with different quantities of transmission times, the network device implements flexible configuration of the quantities of transmission times, a probability that transmission resources in which time resources are the same and frequency resources are the same or in which time resources are the same and frequency resources are adjacent are allocated to different terminal devices is reduced, and therefore, overall system performance is improved.

Figure 24:
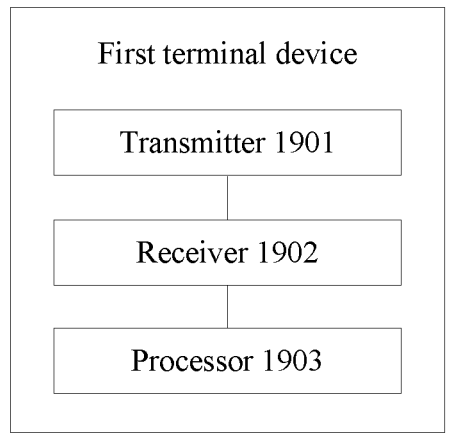
FIG. 24 is a schematic structural diagram of a first terminal device according to another embodiment of the present application.

Another embodiment of the present application provides a first terminal device. As shown in FIG. 24, the first terminal device includes a transmitter 1901 and a receiver 1902.

The transmitter 1901 is configured to send a transmission resource request to a network device.

The receiver 1902 is configured to receive time-frequency resource location information of each resource in a resource set sent by the network device, where a quantity of resources included in the resource set is equal to a quantity of transmission times, the resources are a set of one or more physical resource blocks used by the first terminal device to send a to-be-transmitted service data packet, and the quantity of transmission times is determined by the network device.

The transmitter 1901 is further configured to send, according to the time-frequency resource location information of each resource in the resource set received by the receiver 1902, the to-be-transmitted service data packet to a second terminal device by using each resource in the resource set.

In this embodiment of the present application, further, the receiver 1902 is further configured to receive the quantity of transmission times sent by the network device.

In this embodiment of the present application, further, the receiver 1902 is specifically configured to: receive the quantity of transmission times broadcast by the network device by using a system broadcast message, radio resource control RRC signaling, or a common control channel; or receive the quantity of transmission times sent by the network device by using dedicated RRC signaling or a dedicated control channel.

In this embodiment of the present application, further, the transmitter 1901 is further configured to send scheduling assignment SA information to the second terminal device before sending, according to the time-frequency resource location information of each resource in the resource set, the to-be-transmitted service data packet to the second terminal device by using each resource in the resource set, where the SA information carries the quantity of transmission times.

In this embodiment of the present application, further, the transmitter 1901 indicates the quantity of transmission times by using indication information added in the SA information.

In this embodiment of the present application, further, the transmitter 1901 indicates the quantity of transmission times by using a demodulation reference signal DMRS of the SA information.

The first terminal device further includes a processor 1903.

The processor 1903 is configured to set, before the transmitter 1901 sends the scheduling assignment SA information to the second terminal device, one or a combination of a cell identity cell ID, a cyclic shift CS, or an orthogonal cover code OCC of the SA information corresponding to the quantity of transmission times, and generate the DMRS of the SA information.

In this embodiment of the present application, further, the transmitter 1901 indicates the quantity of transmission times by using a scrambling sequence of the SA information.

The first terminal device further includes a processor 1903.

The processor 1903 is configured to set, before the transmitter 1901 sends the scheduling assignment SA information to the second terminal device, a cell ID and/or a radio network temporary identifier RNTI of the SA information corresponding to the quantity of transmission times, generate the scrambling sequence of the SA information, and scramble the SA information according to the scrambling sequence.

In this embodiment of the present application, further, the transmitter 1901 indicates the quantity of transmission times by using a mask.

The first terminal device further includes a processor 1903.

The processor 1903 is configured to multiply, before the transmitter 1901 sends the scheduling assignment SA information to the second terminal device, a cyclic redundancy check CRC of the SA information by the mask corresponding to the quantity of transmission times.

It should be noted that, for a specific working process of each functional module in the first terminal device provided by this embodiment of the present application, reference may be made to a detailed description of a corresponding process in a method embodiment. Details are not described again herein in this embodiment of the present application.

The first terminal device provided by this embodiment of the present application can receive, after sending a transmission resource request to a network device, time-frequency resource location information of each resource in a resource set sent by the network device, where the resource set is allocated to the first terminal device according to a determined quantity of transmission times and includes a quantity of resources that is equal to the quantity of transmission times, and further send a to-be-transmitted service data packet according to the time-frequency resource location information of each resource in the resource set. In this way, the network device flexibly configures the quantity of transmission times, a probability that transmission resources in which time resources are the same and frequency resources are the same or in which time resources are the same and frequency resources are adjacent are allocated to different terminal devices is reduced, and therefore, overall system performance is improved.

Figure 25:
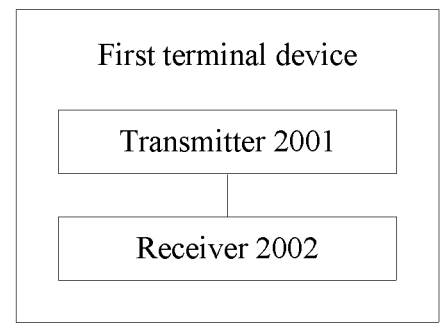
FIG. 25 is a schematic structural diagram of a first terminal device according to another embodiment of the present application.

Another embodiment of the present application provides a first terminal device. As shown in FIG. 25, the first terminal device includes a transmitter 2001 and a receiver 2002.

The transmitter 2001 is configured to send a transmission resource request to a network device.

The receiver 2002 is configured to receive time-frequency resource location information of each resource in a resource set sent by the network device, where a quantity of resources included in the resource set is equal to a quantity of transmission times configured for a first resource pool, the resources are a set of one or more physical resource blocks used by the first terminal device to send a to-be-transmitted service data packet, the first resource pool is determined by the network device from at least two configured resource pools according to a load status of a current cell and first information of the first terminal device, quantities of transmission times corresponding to resource pools in the at least two resource pools are different, and the first information of the first terminal device includes at least one of the following: a level of the first terminal device, a service type of the first terminal device, or a quality of service QoS requirement of the first terminal device.

The transmitter 2001 is further configured to send, according to the time-frequency resource location information of each resource in the resource set received by the receiver 2002, the to-be-transmitted service data packet to a second terminal device by using each resource in the resource set.

In this embodiment of the present application, further, the receiver 2002 is further configured to receive configuration information of each resource pool in the at least two resource pools, sent by the network device, where the configuration information of the resource pool includes a quantity of transmission times configured for the resource pool.

It should be noted that, for a specific working process of each functional module in the first terminal device provided by this embodiment of the present application, reference may be made to a detailed description of a corresponding process in a method embodiment. Details are not described again herein in this embodiment of the present application.

The first terminal device provided by this embodiment of the present application can receive, after sending a transmission resource request to a network device, time-frequency resource location information of each resource in a resource set sent by the network device, where the resource set is allocated to the first terminal device according to a quantity of transmission times configured for a first resource pool and includes a quantity of resources that is equal to the quantity of transmission times, and further send a to-be-transmitted service data packet according to the time-frequency resource location information of each resource in the resource set, where the first resource pool is determined by the network device from at least two configured resource pools according to a load status of a current cell and first information of the first terminal device. In this way, by configuring multiple resource pools with different quantities of transmission times, the network device implements flexible configuration of the quantities of transmission times, a probability that transmission resources in which time resources are the same and frequency resources are the same or in which time resources are the same and frequency resources are adjacent are allocated to different terminal devices is reduced, and therefore, overall system performance is improved.

Figure 26:
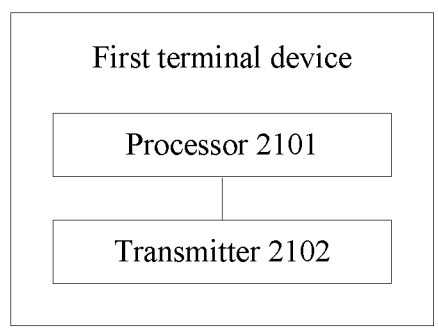
FIG. 26 is a schematic structural diagram of a first terminal device according to another embodiment of the present application.

Another embodiment of the present application provides a first terminal device. As shown in FIG. 26, the first terminal device includes a processor 2101 and a transmitter 2102.

The processor 2101 is configured to determine a first resource pool according to first information of the first terminal device, where the first resource pool is one of at least two preconfigured resource pools, different quantities of transmission times are configured for resource pools in the at least two resource pools, and the first information of the first terminal device includes at least one of the following: a level of the first terminal device, a service type of the first terminal device, or a quality of service QoS requirement of the first terminal device; and determine a resource set from the first resource pool according to a quantity of transmission times configured for the first resource pool, where a quantity of resources included in the resource set is equal to the quantity of transmission times configured for the first resource pool, and the resources are a set of one or more physical resource blocks used by the first terminal device to send a to-be-transmitted service data packet.

The transmitter 2102 is configured to send the to-be-transmitted service data packet to a second terminal device by using each resource in the resource set determined by the processor 2101.

It should be noted that, for a specific working process of each functional module in the first terminal device provided by this embodiment of the present application, reference may be made to a detailed description of a corresponding process in a method embodiment. Details are not described again herein in this embodiment of the present application.

The first terminal device provided by this embodiment of the present application can first determine a first resource pool from at least two preconfigured resource pools according to first information of the first terminal device, then determine, according to a quantity of transmission times configured for the first resource pool, a resource set including a quantity of resources that is equal to the quantity of transmission times, and further send a to-be-transmitted service data packet to a second terminal device by using each resource in the resource set. In this way, by preconfiguring multiple resource pools with different quantities of transmission times, flexible configuration of the quantities of transmission times is implemented, a probability that different terminal devices select transmission resources in which time resources are the same and frequency resources are the same or in which time resources are the same and frequency resources are adjacent is reduced, and therefore, overall system performance is improved.

Figure 27:
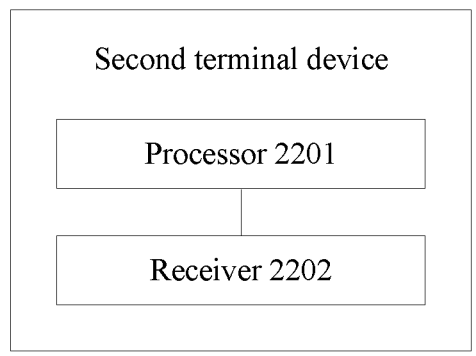
FIG. 27 is a schematic structural diagram of a second terminal device according to another embodiment of the present application.

Another embodiment of the present application provides a second terminal device. As shown in FIG. 27, the second terminal device includes a processor 2201 and a receiver 2202.

The processor 2201 is configured to obtain a quantity of transmission times.

The receiver 2202 is configured to receive, according to the quantity of transmission times obtained by the processor 2201, a to-be-transmitted service data packet sent by a first terminal device by using each resource in a resource set, where a quantity of resources included in the resource set is equal to the quantity of transmission times, and the resources are a set of one or more physical resource blocks.

In this embodiment of the present application, further, the receiver 2202 is further configured to receive the quantity of transmission times broadcast by a network device by using a system broadcast message, radio resource control RRC signaling, or a common control channel.

In this embodiment of the present application, further, the receiver 2202 is further configured to receive, before the processor 2201 obtains the quantity of transmission times, scheduling assignment SA information sent by the first terminal device, where the SA information carries the quantity of transmission times.

In this embodiment of the present application, further, indication information added in the SA information received by the receiver 2202 is used to indicate the quantity of transmission times.

The processor 2201 is specifically configured to determine the quantity of transmission times according to the indication information.

In this embodiment of the present application, further, a demodulation reference signal DMRS of the SA information received by the receiver 2202 is used to indicate the quantity of transmission times.

The processor 2201 is specifically configured to obtain the DMRS of the SA information, and determine the quantity of transmission times based on one or a combination of a cell identity cell ID, a cyclic shift CS, or an orthogonal cover code OCC in the DMRS.

In this embodiment of the present application, further, a scrambling sequence of the SA information received by the receiver is used to indicate the quantity of transmission times.

The processor 2201 is specifically configured to descramble the SA information, obtain the scrambling sequence of the SA information, and determine the quantity of transmission times according to a cell ID and/or a radio network temporary identifier RNTI in the scrambling sequence.

In this embodiment of the present application, further, a mask received by the receiver 2202 is used to indicate the quantity of transmission times.

The processor 2201 is specifically configured to obtain a cyclic redundancy check CRC of the SA information, and determine the quantity of transmission times according to the mask corresponding to the CRC.

In this embodiment of the present application, further, the processor 2201 is specifically configured to determine, according to configuration information of a currently monitored first resource pool, that a quantity of transmission times configured for the first resource pool is the quantity of transmission times, where the configuration information of the first resource pool includes the quantity of transmission times configured for the first resource pool.

In this embodiment of the present application, further, the first resource pool currently monitored by the processor 2201 is one of at least two preconfigured resource pools.

In this embodiment of the present application, further, the first resource pool currently monitored by the processor 2201 is one of at least two resource pools configured by a network device.

The receiver 2202 is further configured to receive, before the processor 2201 determines, according to the configuration information of the currently monitored first resource pool, the quantity of transmission times configured for the first resource pool, the configuration information of the first resource pool sent by the network device.

It should be noted that, for a specific working process of each functional module in the second terminal device provided by this embodiment of the present application, reference may be made to a detailed description of a corresponding process in a method embodiment. Details are not described again herein in this embodiment of the present application.

The second terminal device provided by this embodiment of the present application first obtains a quantity of transmission times, and then receives, according to the obtained quantity of transmission times, a to-be-transmitted service data packet sent by a first terminal device by using each resource in a resource set, where a quantity of resources included in the resource set is equal to the quantity of transmission times. In this way, the quantity of transmission times is flexibly configured, a probability that different terminal devices select transmission resources in which time resources are the same and frequency resources are the same or in which time resources are the same and frequency resources are adjacent is reduced, and therefore, overall system performance is improved.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or part of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may be one or more physical units, may be located in one place, or may be distributed on different places. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of the present application. The foregoing storage medium includes: any medium that can store program code, such as a USB flash drive, a removable hard disk, a read-only memory (English: Read-Only Memory, ROM for short), a random access memory (English: Random Access Memory, RAM for short), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A resource allocation method, comprising:
    sending a transmission resource request to a network device, wherein the transmission resource request requests transmission resources for transmitting a to-be-transmitted service data packet to an apparatus; and
    after sending the transmission resource request to the network device:
        receiving time-frequency resource location information of each resource in a resource set from the network device, wherein resources comprised in the resource set are a set of one or more physical resource blocks used to send the to-be-transmitted service data packet;
        receiving a quantity of transmission times from the network device, wherein the quantity of transmission times is equal to a quantity of the resources comprised in the resource set;
        sending scheduling assignment (SA) information to the apparatus, wherein a demodulation reference signal (DMRS) of the SA information carries the quantity of transmission times; and
        sending, according to the time-frequency resource location information of each resource in the resource set, the to-be-transmitted service data packet to the apparatus using each resource in the resource set.

2. The method according to claim 1, wherein the receiving the quantity of transmission times from the network device comprises:
    receiving the quantity of transmission times from the network device by using at least one of dedicated radio resource control (RRC) signaling and a dedicated control channel.

3. The method according to claim 1, wherein indication information added in the SA information is used to indicate the quantity of transmission times.

4. A first apparatus, comprising:
    a transmitter, the transmitter configured to send a transmission resource request to a network device, wherein the transmission resource request requests transmission resources for transmitting a to-be-transmitted service data packet to a second apparatus; and
    a receiver, the receiver configured to receive time-frequency resource location information of each resource in a resource set from the network device, wherein resources comprised in the resource set are a set of one or more physical resource blocks used to send the to-be-transmitted service data packet;
    wherein the receiver is further configured to receive a quantity of transmission times from the network device, wherein the quantity of transmission times is equal to a quantity of the resources comprised in the resource set; and
    the transmitter is further configured to send scheduling assignment (SA) information to the second apparatus, wherein a demodulation reference signal (DMRS) of the SA information carries the quantity of transmission times, and send, according to the time-frequency resource location information of each resource in the resource set received by the receiver, the to-be-transmitted service data packet to the second apparatus using each resource in the resource set.

5. The first apparatus according to claim 4, wherein the receiver is configured to:
    receive the quantity of transmission times from the network device by using at least one of dedicated RRC signaling and a dedicated control channel.

6. The first apparatus according to claim 4, wherein the transmitter indicates the quantity of transmission times by using indication information added in the SA information indicates the quantity of transmission times.

7. A second apparatus, comprising:
    a receiver, the receiver configured to receive scheduling assignment (SA) information from a first apparatus, wherein a demodulation reference signal (DMRS) of the SA information carries a quantity of transmission times; and
    a processor, the processor configured to obtain the quantity of transmission times; wherein
    the receiver is further configured to receive, according to the quantity of transmission times obtained by the processor, a to-be-transmitted service data packet from the first apparatus using each resource in a resource set, wherein a quantity of resources comprised in the resource set is equal to the quantity of transmission times, and the resources are a set of one or more physical resource blocks.

8. The second apparatus according to claim 7, wherein indication information added in the SA information received by the receiver indicates the quantity of transmission times; and
    the processor is configured to determine the quantity of transmission times according to the indication information.

* * * * *

UNITED STATES PATENT AND TRADEMARK OFFICE
CERTIFICATE OF CORRECTION

| | |
|---|---|
| PATENT NO. | : 10,798,716 B2 |
| APPLICATION NO. | : 15/833578 |
| DATED | : October 6, 2020 |
| INVENTOR(S) | : Zhenshan Zhao and Wei Sun |

It is certified that error appears in the above-identified patent and that said Letters Patent is hereby corrected as shown below:

On the Title Page

Item (56), Column 2, Line 12 delete "V124.0" and insert -- V12.4.0 --, therefor.

Signed and Sealed this
Fifth Day of January, 2021

Andrei Iancu
*Director of the United States Patent and Trademark Office*